(12) United States Patent
Beachy et al.

(10) Patent No.: US 11,228,051 B2
(45) Date of Patent: Jan. 18, 2022

(54) ELECTROCHEMICAL CELL AND METHOD OF USING SAME

(71) Applicant: Power to Hydrogen LLC, Columbus, OH (US)

(72) Inventors: Michael G. Beachy, Gahana, OH (US); Christopher T. Holt, Bexley, OH (US); Minette Ocampo, Columbus, OH (US); Paul H. Matter, Columbus, OH (US)

(*) Notice: Subject to any disclaimer, the term of this patent is extended or adjusted under 35 U.S.C. 154(b) by 0 days.

(21) Appl. No.: 17/074,297

(22) Filed: Oct. 19, 2020

(65) Prior Publication Data

US 2021/0036352 A1 Feb. 4, 2021

Related U.S. Application Data

(63) Continuation-in-part of application No. 15/957,052, filed on Apr. 19, 2018, now Pat. No. 10,844,497.

(60) Provisional application No. 62/487,134, filed on Apr. 19, 2017.

(51) Int. Cl.

| | |
|---|---|
| *H01M 8/1004* | (2016.01) |
| *H01M 8/0438* | (2016.01) |
| *H01M 8/18* | (2006.01) |
| *H01B 1/12* | (2006.01) |
| *C25B 9/10* | (2006.01) |
| *C25B 1/10* | (2006.01) |
| *H01M 8/023* | (2016.01) |
| *H01M 8/0271* | (2016.01) |
| *C25B 1/04* | (2021.01) |
| *C25B 9/23* | (2021.01) |
| *C25B 9/73* | (2021.01) |

(52) U.S. Cl.
CPC ............. *H01M 8/1004* (2013.01); *C25B 1/04* (2013.01); *C25B 9/23* (2021.01); *C25B 9/73* (2021.01); *H01B 1/122* (2013.01); *H01M 8/023* (2013.01); *H01M 8/0271* (2013.01); *H01M 8/04432* (2013.01); *H01M 8/18* (2013.01)

(58) Field of Classification Search
CPC ......... H01M 8/083; H01M 2300/0014; H01M 8/186
See application file for complete search history.

(56) References Cited

U.S. PATENT DOCUMENTS

| | | | |
|---|---|---|---|
| 4,909,912 A * | 3/1990 | Oda | ........................ C25B 9/19 205/524 |
| 6,447,942 B1 | 9/2002 | Ovinsky | |
| 7,943,258 B2 | 5/2011 | Gottesfeld | |
| 2003/0059664 A1 | 3/2003 | Menjak | |
| 2006/0057436 A1 | 3/2006 | Osenar | |
| 2009/0035625 A1* | 2/2009 | Ohkawa | ............... H01M 8/1011 429/532 |

(Continued)

*Primary Examiner* — Christopher P Domone

(57) ABSTRACT

A novel electrochemical cell is disclosed in multiple embodiments. The instant invention relates to an electrochemical cell design. In one embodiment, the cell design can electrolyze water into pressurized hydrogen using low-cost materials. In another embodiment, the cell design can convert hydrogen and oxygen into electricity. In another embodiment, the cell design can electrolyze water into hydrogen and oxygen for storage, then later convert the stored hydrogen and oxygen back into electricity and water. In some embodiments, the cell operates with a wide internal pressure differential.

24 Claims, 11 Drawing Sheets

(56) References Cited

U.S. PATENT DOCUMENTS

2009/0081501 A1* 3/2009 Vu ........................ C01B 3/065
                                                             429/436
2010/0021777 A1   1/2010 Gottesfeld

* cited by examiner

ELECTROCHEMICAL CELL AND METHOD OF USING SAME

CROSS-REFERENCE TO RELATED APPLICATIONS

This application is a continuation-in part of and claims the benefit of U.S. patent application Ser. No. 15/957,052, filed Apr. 19, 2018, which in turn claims priority to U.S. Provisional Patent Application 62/487,134; filed Apr. 19, 2017.

STATEMENT REGARDING FEDERALLY SPONSORED RESEARCH OR DEVELOPMENT

This invention was made with government support under Department of Energy Contract Number DE-SC0013111. The government may have certain rights in the invention.

TECHNICAL FIELD

The present disclosure relates generally to an electrochemical cell and a method of using the same.

BACKGROUND OF THE INVENTION

Energy storage is required to maintain reliable electricity delivery from energy producers to their customers. As electrical loads on the grid change throughout the day, stored energy supplies electricity during increased power demand periods. Further, as more renewable and alternative energy sources are added, energy storage will maximize the usefulness of these technologies. As energy demands continue to expand, and more renewable energy, i.e., wind and solar, is added to the grid, new distributed energy storage technologies will be needed that are not dependent on geographic features.

Battery technologies can provide energy storage for some applications but are not economically well-suited for long-duration charge/discharge, such as load-leveling of renewable energy. Consequently, development of new energy storage devices will augment the existing grid and reduce the capital investment in construction upgrades. As ever-increasing renewable energy is implemented, lower-cost energy storage solutions for renewable energy will be necessary to keep electricity costs low for consumers.

Regenerative fuel cells offer a unique solution for grid energy storage. Unlike batteries, regenerative fuel cells can cost-effectively store a large amount of energy in the form of hydrogen. Energy in the form of hydrogen can be stored at a cost less than $20/kW-hr in large gas cylinders, significantly lower than the cost of batteries. Regenerative fuel cells or electrolysis systems could also provide an added benefit of hydrogen generation for fuel cell vehicles. Unfortunately, there are several limitations with existing technology for regenerative fuel cell and electrolysis systems.

Currently, two technologies are used commercially for water electrolysis. Alkaline electrolyzers are an established technology that rely on two electrodes in a liquid electrolyte. These electrodes are typically separated by a non-electrically-conductive porous layer, called the separator. Through application of a voltage, hydrogen and oxygen are evolved from the cathode and anode, respectively. Due to the permeability of the separator, the hydrogen gas cannot be pressurized substantially through electrochemical means. Small differences in pressure between the two sides of the cell can cause catastrophic cell failures. A mechanical compressor is typically used for hydrogen compression, requiring an additional system component that is exceedingly expensive for many scales and applications.

The second common method for water electrolysis is a proton exchange membrane (PEM) electrolyzer. This technology uses a gas-impermeable polymer membrane as the electrolyte. Water vapor or liquid water is fed to at least one of the electrodes. The gases can be easily compressed electrochemically with a PEM electrolyzer, and the cells can operate with pressure differences greater than 100 bar. PEM electrolyzers can also be made to operate reversibly, producing electricity and water from hydrogen and oxygen. The drawback of PEM electrolyzers and PEM reversible fuel cells is the cost of the components. The acidic electrolyte and electrolysis operating voltages necessitate the selection of expensive components for long-term stability. Platinum and Iridium may be used as electrode catalysts. Additionally, electrode current collectors must be fabricated of corrosion-resistant materials. PEM electrolysis systems are consequently too expensive for wide-scale commercial adoption for many grid-scale energy storage applications.

With the development of polymer membranes, known as Anion Exchange Membranes (AEMs), that conduct hydroxide ions and other anions, low-cost cells that can produce pressurized hydrogen have become possible. However, hydrocarbon-based AEMs have challenges with remaining conductive if operated in the absence of liquid water. Further, without liquid electrolyte present, ionomers in the electrode layer are required to introduce ion conduction beyond the 2-dimensional electrolyte/electrode interface, a necessity for obtaining high areal current density.

U.S. Pat. No. 7,943,258 discloses an AEM fuel cell design that illustrates the challenges found with AEM cell designs. This patent uses an AEM as the electrolyte and ionomer in the electrode layers. Those skilled in the art would appreciate that keeping an AEM hydrated and active for more than a few hours in the absence of liquid electrolyte is very challenging. In the '258 patent, the membrane is kept in a constant hydrated state by delivery of water to the edge of the membrane, outside of the active electrode area, through several unique designs. In the absence of liquid electrolyte, ionomers are required in the electrode layer of this cell design to enable ion conduction to permeate the electrode and operate at substantial current density. While the cell design would be expected to operate well as a fuel cell utilizing pure hydrogen and pure oxygen, it would be expected to slowly lose performance in the presence of carbon dioxide in the fuel or oxidant. Further, this cell design is not conducive to electrolysis operation for several reasons.

First, hydrocarbon ionomers used in the oxygen electrode would not be stable under typical electrolysis voltages. Second, the wicking mechanism used to deliver water to hydrate the membrane would not deliver water to the cell at a sufficient rate to match the water consumption during high current electrolysis.

Using liquid electrolytes, alkaline cell designs have been demonstrated for electrolysis and reversible fuel cell/electrolysis operation. U.S. Pat. No. 6,447,942 discloses a reversible fuel cell design with an alkaline liquid electrolyte. The design uses a porous separator between the electrodes. Another liquid electrolyte cell design is disclosed in United States Patent Application No. 2006/0057436A1. This design also utilizes a porous diaphragm separator. In both designs, the cells would be susceptible to carbon oxide contaminants in the fuel or oxidant when operated as a fuel cell. In the oxidant, over long-term operation, carbon dioxide would result in precipitation of carbonates in the cathode, thus blocking gas flow. In the fuel, anode catalysts, such as platinum or nickel, would be poisoned by carbon dioxide. Carbon dioxide could similarly precipitate as carbonates, blocking gas flow in the anode. In both cases, the cell designs would not permit significant pressurization of the product gases during electrolysis, because of the need for a porous separator. Consequently, while liquid electrolyte alkaline fuel cells and reversible alkaline fuel cells may work for many ideal cases, they have significant limitations.

A common design for electrolysis cells is the combination of a gas-impermeable membrane separator with electrodes flooded by water and/or electrolyte. U.S. Pat. No. 4,909,912 discloses such a design. This design is not practical for fuel cell operation because gas cannot be fed to catalysts in the flooded electrodes at a sufficient rate to generate high current density. Beyond not being useful as a fuel cell design, limitations with this cell design for electrolysis are that additional water and product gas separation steps are required to recover the product. Further, corrosion on the anode, i.e., the oxygen evolving electrode for water electrolysis, can be severe for any components in contact with the electrolyte. In this cell design, current collectors and bi-polar plates would be in contact with the electrolyte, exposing them to potentially corrosive electrochemical reactions.

Moreover, AEM degradation is also greater when in direct contact with the oxygen electrode. Patent application WO2011004343A1 discloses a traditional membrane electrolyzer design with an Anion Exchange Membrane (AEM), Membrane Electrode Assembly (MEA), and a dry hydrogen electrode. This approach has all the limitations mentioned above. Additionally, MEAs cannot be easily produced with all AEM material options because AEM expansion often occurs during hydration. Finally, the prior art for AEM designs is silent on handling high pressure differential between hydrogen and oxygen while maintaining a thin membrane with low resistance.

U.S. Patent Appl. 2010/0276299A1 discloses a cylindrical liquid alkaline cell design for generating high pressure hydrogen. The disclosed example uses a separator that is permeable to gases, thus pressure differential is not feasible with this design. The non-planar design would be difficult to manufacture at larger scales and would occupy greater space than planar designs. Additionally, similar to other existing low temperature electrolyzer designs, such a cell is not easily reversible.

U.S. Pat. No. 6,916,443B2 discusses designs for high pressure cell operation with a Proton Exchange Membrane (PEM) electrolysis cell based on using the electrode as a support for the membrane. Effective electrodes have a number of requirements, including porosity for gas transport, electrical conductivity, corrosion resistance in the gas/voltage/pH environment. Despite the array of options listed, few materials can effectively meet all of the requirements of both an electrode and a mechanical support. Porous titanium frit is generally used for PEM electrolyzers because it is porous, strong, and has low solubility in acid, thus minimizing membrane ion contamination. The limitations of this approach for pressure differential operation include the high cost of titanium or other metal porous frit options, high catalyst cost of platinum-iridium for the acidic environment, the high cost our fluorinated membrane, and the oxygen flammability of titanium frit, which would thus limit the ability to safely operate such an electrolyzer for producing pressurized oxygen. Further, PEM electrolyzers rely on membrane materials that have high hydrogen permeability relative to alkaline electrolyte on an equivalent conductivity basis, thus resulting in high hydrogen permeation at high pressure. Additionally, similar to most other existing low temperature electrolyzer designs, such a cell is not easily reversible.

Patent application WO2017054074 discusses the challenges of operating an electrolyzer at high pressure or high pressure differential between gases. The patent discloses a traditional PEM electrolyzer cell design. To address pressure differential the design uses off-set seal frame alignment, commonly used in fuel cells to prevent membrane tears along the edge, and titanium frit to support the membrane on the low-pressure side. As noted above, relying on metal frit for mechanical support introduces a number of limitations. Additionally, similar to most other existing low temperature electrolyzer designs, such a cell is not easily reversible.

U.S. Pat. No. 7,014,947 discloses a porous membrane support for a PEM electrolyzer in which the membrane support is percolated by the ion-conducting membrane material. This design relies on polymeric membrane material to conduct ions from one electrode to the next through the entire thickness of the support structure. Consequently, the design would have higher resistance compared to a thin membrane, a porous structure of similar thickness permeated with liquid electrolyte, or a combination of a thin membrane and a porous structure permeated with liquid electrolyte. Further, the design has all of the other limitations previously mentioned for a PEM electrolyzer.

In many instances of a reversible fuel cell and/or electrolyzer, it is desirable to generate high pressure gases. Electrochemical pressurization with the electrolyzer reduces system cost and efficiency losses associated with mechanically compressing gas to storage pressure. In some cases, it is desirable to compress hydrogen from 30 bar to greater than 700 bar, for more effective storage. For oxygen storage, pressures of 30 bar to 200 bar may be acceptable for storage. High oxygen pressure creates material flammability concerns, while lower pressures require more tank volume to store an equivalent mass of oxygen. Consequently, in many cases it is desirable to operate a water electrolyzer and/or reversible fuel cell under differential pressure conditions, in which the hydrogen and oxygen gas are produced at different pressures and subsequently stored at different pressures.

Proton-exchange membrane cells efficiently operate at limited hydrogen pressure, typically about 30 bar. PEM electrolysis membranes are quite permeable to hydrogen compared to alkaline electrolyte on an equivalent conductivity basis. At higher hydrogen pressures, more hydrogen permeates through the membrane, causing efficiency losses and safety concerns. To combat hydrogen permeability losses a thicker membrane may be used; however, this increases ionic resistance, resulting in ohmic efficiency losses. Cells with liquid alkaline electrolyte can theoretically achieve 38 times lower permeability at equivalent conductivity. Based on this fact, liquid alkaline electrolyzer systems could theoretically operate as efficiently as a PEM electrolyzer system at 38 times higher pressure, or >900 bar instead of 30 bar. However, traditional liquid electrolyte with a porous separator would not be able to safely handle significant pressure differences between hydrogen and oxygen. The combination of a gas impermeable membrane and liquid electrolyte, in series, in the instant invention thus solves the challenge of high hydrogen pressure and pressure differential for water electrolysis.

A further challenge with AEM-based water electrolyzers and reversible fuel cells is degradation of ionomers and the AEM. In particular, the high voltage oxygen electrode quickly degrades ionomers in the oxygen electrode during electrolysis. Highly active oxygen- and hydrogen-oxygen-containing intermediate species, such as free radical species, can attack and degrade the polymeric hydrocarbon AEMs that are immediately adjacent to the oxygen electrode. In the instant invention, having physical distance between the oxygen electrode and the AEM layer can extend AEM lifetime by allowing intermediate species to decompose before reaching the AEM. Having a tortuous path and/or a catalytic surface capable of decomposing oxygen intermediates between the AEM and oxygen electrode can thus further extend AEM lifetime.

SUMMARY OF THE INVENTION

The instant invention as disclosed in multiple embodiments, all meant by way of example only and not limitation, and includes a cell design that solves the limitations of existing liquid electrolyte cells and AEM cell designs. The design, in multiple embodiments, enables much lower cost components than PEM electrolyzers and reversible fuel cells. The design, in multiple embodiments, may utilize a combination of at least one gas-impermeable AEM in contact with a liquid electrolyte, with at least one electrode not flooded by liquid, thus allowing gas flow at a high rate in to and/or out of the electrode. The gas-impermeable AEM can be any AEM material that is substantially gas-impermeable and conducts anions, including any membrane material that is impermeable to gas and conducts hydroxide anions.

In another preferred embodiment, aqueous KOH may be used as the liquid electrolyte component. However, in various embodiments, liquid electrolytes may include any aqueous salt solution with a pH>7. In another preferred embodiment of the cell design, two AEMs separated by a porous layer may be permeated with aqueous liquid electrolyte that may be used to separate the electrodes. The electrodes can be any layer in which an electrochemical reaction takes place. In another preferred embodiment, the electrodes would consist of a hydrogen electrode in which hydrogen evolution and hydrogen oxidation can occur, and an oxygen electrode in which oxygen evolution and oxygen reduction can occur.

In other embodiments these electrodes may be useful for oxygen reduction, oxygen evolution, hydrogen reduction, hydrogen evolution, fluorine evolution, chlorine evolution, bromine evolution, iodine evolution, and a number of other electrochemical reactions.

In an embodiment, a porous matrix, placed between two AEM layers, may be conductive or non-conductive. In another embodiment, a porous matrix, placed between an AEM layer and porous separator layer, may be conductive or non-conductive. In another preferred embodiment, the porous layer may be nickel metal foam, and may be permeated with aqueous potassium hydroxide. In an embodiment of the cell design, at least one electrode uses an ionomer to achieve optimal performance.

In another preferred embodiment, a hydrogen electrode uses an anion-conducting ionomer. In yet another preferred embodiment, the oxygen electrode uses a fluorinated binder and/or a fluorinated ionomer.

In an additional preferred embodiment, at least one electrode uses a mixture of hydrophilic and hydrophobic fluorinated binder. In another preferred embodiment, both electrodes are not flooded with liquid but the membrane may be in contact with aqueous electrolyte, allowing operation as a fuel cell and/or electrolyzer. In yet another preferred embodiment, the liquid electrolyte may be stored in an external reservoir and circulated through the electrode separator layer.

In another embodiment, the cell operates as a fuel cell with air as the oxidant. The liquid electrolyte in contact with the AEM prevents the AEM from being converted to its carbonate form. In one embodiment of the cell, the hydrogen electrode contains a non-Ni and non-Pt catalyst that is not severely poisoned by small quantities of carbon monoxide. In one embodiment of the cell, the anode operates on a hydrogen-containing fuel that also contains carbon monoxide and carbon dioxide.

In another embodiment the cell operates as fuel cell. In another embodiment the cell operates as an electrolyzer. In another embodiment the cell operates as both a fuel cell and electrolyzer. In another embodiment the cell operates as an electrolyzer with an oxygen depolarized cathode.

BRIEF DESCRIPTION OF THE ILLUSTRATIONS

Without limiting the scope of the electrochemical cell as disclosed herein and referring now to the drawings and figures.

Figure 7:
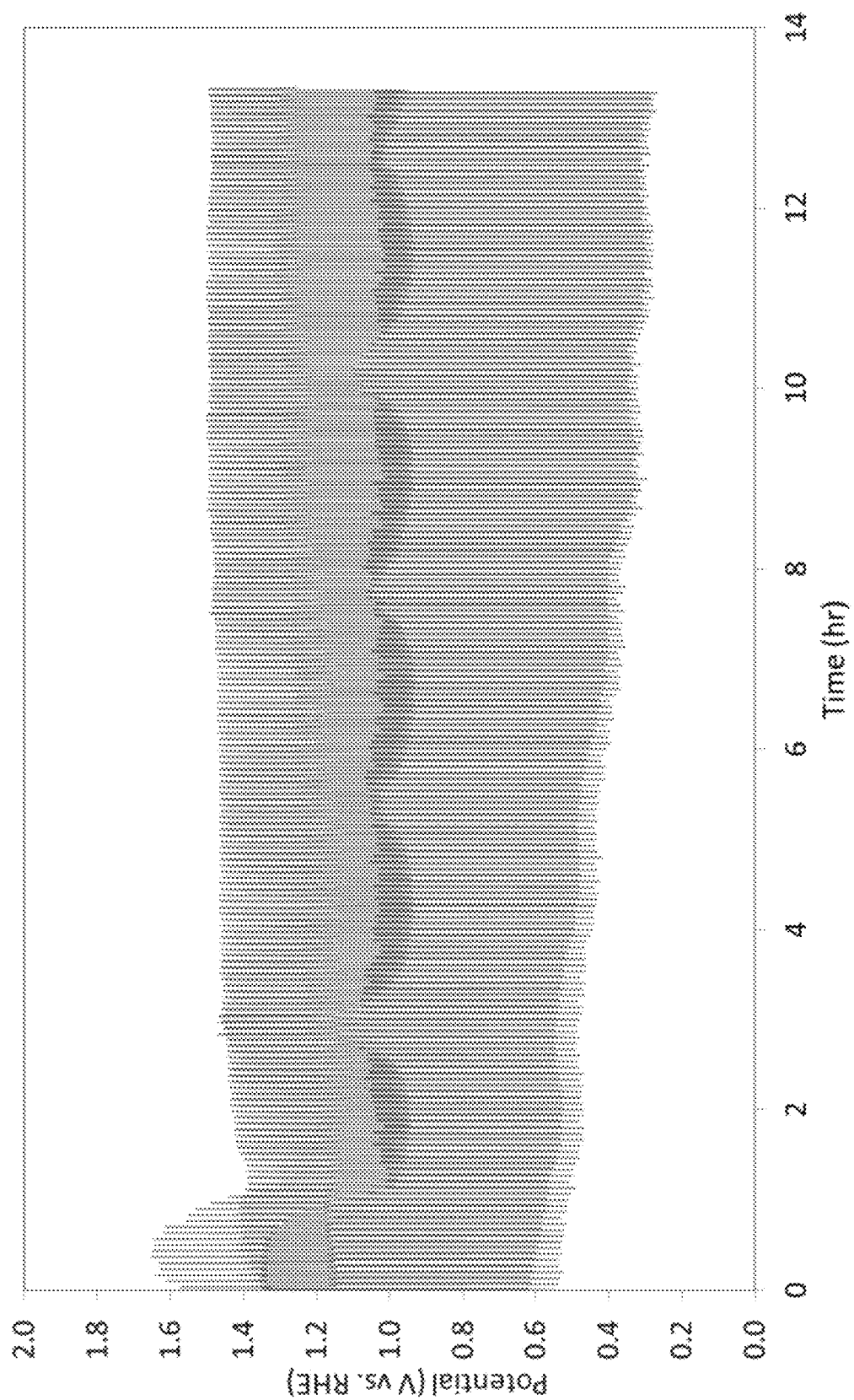
Figure 8:
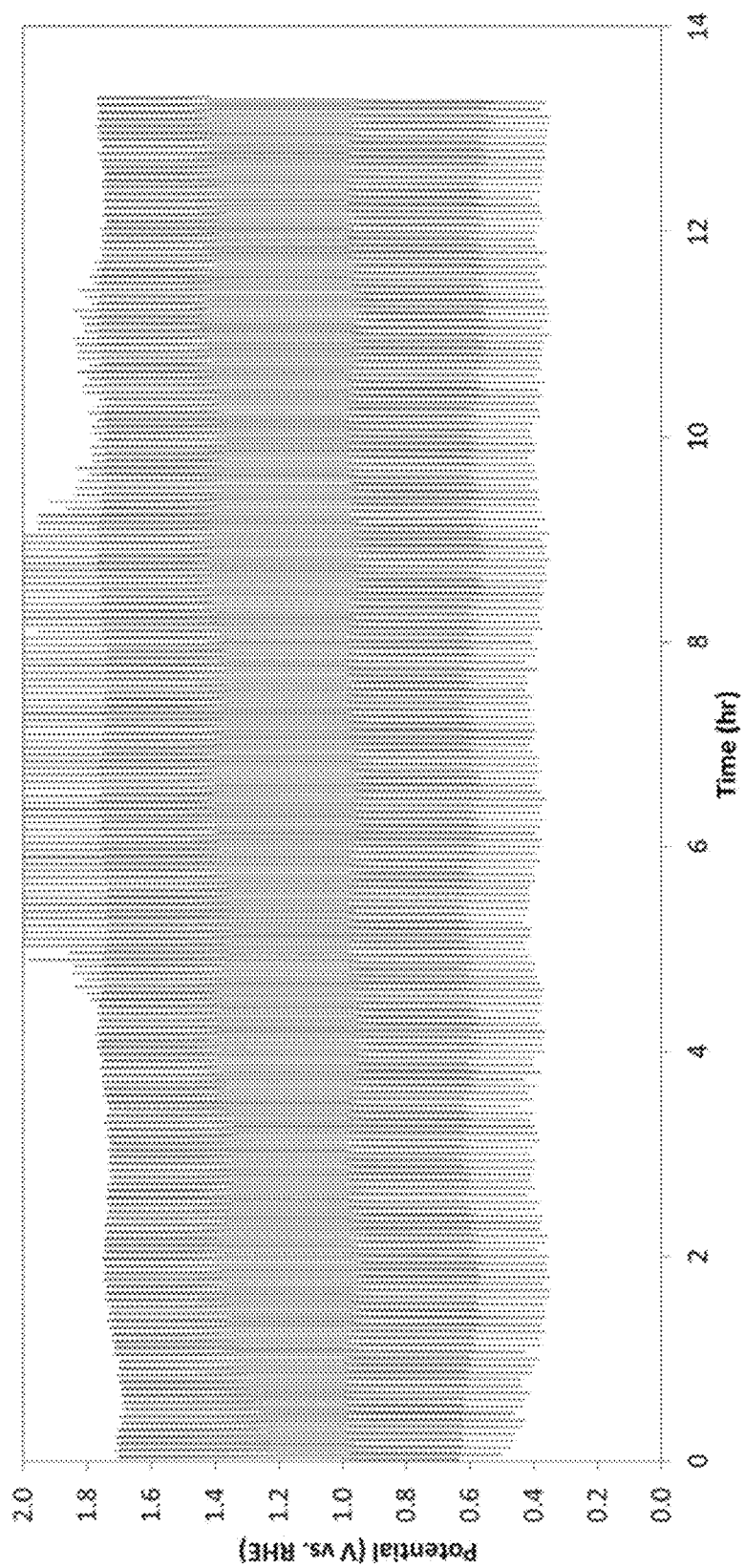

FIG. 7 shows exemplary oxygen electrode voltage for an electrode with a hydrocarbon-based anion-conducting ionomer at 45° C. in humidified oxygen (25° C. dew point); 200 cycles at 40 mA/cm$^2$ oxygen evolution, 200 mA/cm$^2$ oxygen reduction with 1 minute relaxation; and FIG. 8 shows exemplary oxygen electrode voltage for an electrode with a sulfonated tetrafluoroethylene based fluoropolymer-copolymer (hereafter, "NAFION®," E. I. Dupont de Nemours and Co., Wilmington, Del., USA) ionomer/binder at 45° C. in humidified oxygen (25° C. dew point); 200 cycles at 40 mA/cm$^2$ oxygen evolution, 200 mA/cm$^2$ oxygen reduction with 1 minute relaxation.

These illustrations are provided to assist in the understanding of the exemplary embodiments of an electrochemical cell, and a method for using the same, as described in more detail below, and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The instant invention as disclosed in multiple embodiments, all meant by way of example only and not limitation and includes a cell design that solves the limitations of existing liquid electrolyte cells, PEM cell designs, and AEM cell designs. The design, in multiple embodiments, enables much lower cost components than PEM electrolyzers, reversible fuel cells and conventional liquid electrolyte electrolyzers. The design, in multiple embodiments, may utilize a combination of at least one gas-impermeable AEM in contact with a liquid electrolyte, with at least one electrode not flooded by liquid, thus allowing gas flow at a high rate in to and/or out of the electrode. The gas-impermeable AEM can be any AEM material that is substantially gas-impermeable and conducts anions, including any membrane material that is impermeable to gas and conducts hydroxide anions.

These include cationic polymer membranes, anion-conducting ceramic membranes, cationic polymer membranes mechanically supported by a mesh or porous substrate, polymer membranes with a cation functional group, polymers with N+H3R functional group, polymers with N+H2R2 functional group, polymers with N+HR3 functional group, polymers with N+R4 functional group, polymers with P+ functional group, and mixtures thereof. One skilled in the art will readily visualize other possible materials and combinations of the same.

In a preferred embodiment, aqueous KOH may be used as the electrolyte. However, in various embodiments, electrolytes may include any aqueous salt solution with a pH>7; including, Group I, Group II, and Transition Metal Hydroxides, Group I, Group II, and Transition Metal Carbonates, Group I, Group II, and Transition Metal Bicarbonates, Group I, Group II, and Transition Metal Acetates, ammonium hydroxide, ammonium carbonate, ammonium bicarbonate, and combinations thereof. The liquid electrolyte can be any high pH aqueous solution, including those noted above, again by way of example only and not limitation.

In a preferred embodiment of the cell design, two AEMs may be separated by a porous matrix layer that may be permeated with aqueous liquid electrolyte. The AEMs and porous matrix are used to separate the electrodes. The electrodes can be any layer in which an electrochemical reaction takes place. In a preferred embodiment the electrodes would consist of a hydrogen electrode in which hydrogen evolution and hydrogen oxidation can occur, and an oxygen electrode in which oxygen evolution and oxygen reduction can occur. As would be known to one skilled in the art; electrode layers may include gas diffusion electrodes or may include flooded electrodes. Examples of electrodes may include catalyst coatings on a backing support, and metallic electrodes. Examples of metallic electrodes further include stainless steel mesh, nickel mesh, titanium mesh, platinum mesh, coated meshes, metallic foams, metallic sponges, and mixtures thereof. Examples of a backing supports include carbon cloth, carbon paper, metallic foam, metallic meshes, expanded metal mesh, and mixtures thereof. Examples of electrode catalysts may include transition metals, such as group 3, 4, 5, 6, 7, 8, 9, 10, 11, and 12 transition metals, alloys of these transition metals, and mixtures thereof.

Specifically, Ti, Cr, Mo, W, Mn, Fe, Co, Ni, Cu, Zn, Ru, Os, Rh, Pd, Ag, Ir, Pt, Au, and Hg are well-known as electrode catalysts to those skilled in the art. Carbides, borides, nitrides, oxides, sulfides, and phosphides of transition metals are also well-known as electrode catalysts to those skilled in the art. Additional catalysts well-known to those skilled in the art include B, Al, Ga, In, Sn, Pb, Sb, Bi, and C. Elemental forms, carbide forms, boride forms, nitride forms, oxide forms, sulfide forms, phosphide forms, and mixtures thereof of catalysts are well-known as electrode catalysts to those skilled in the art. Carbon catalysts may come in a number of forms, including graphite, graphene, single-walled nano-tubes, multi-walled nano-tubes, nano-fibers, spherical particles, amorphous particles, core-shell particles, and mixtures thereof. Carbon catalysts may be doped with a number of elements, including transition metal atoms, B, N, P, O, S, F, Cl, Br, and mixtures thereof.

Electrode catalyst examples also include metal-organic frameworks, conductive polymers, pyrolysis products of hydrocarbons, pyrolysis products of polymers, and mixtures thereof. Catalysts often consist of mixtures of known catalysts. These electrode catalysts may be useful for oxygen reduction, oxygen evolution, hydrogen reduction, hydrogen evolution, fluorine evolution, chlorine evolution, bromine evolution, iodine evolution, and a number of other electrochemical reactions. Electrode catalysts for any gas-evolving or gas-consuming electrochemical reaction may be useful in the instant invention.

The porous matrix, placed in contact with at least one AEM or between two AEM layers, may be conductive or non-conductive. Examples of the porous matrix include: Any open-cell porous material, porous polypropylene, porous polyethylene, asbestos, porous PTFE, metal foam, ceramic foam, nickel metal foam, carbon paper, carbon cloth, carbon sponge, carbon fabric, metal cloth, ceramic cloth, metal sponge, polymer sponge, ceramic sponge, natural sponge, ceramic fabric, metal fabric, polymer fabric, multi-layer etched polymer membrane with flow-through channels, etched or cut channels in a thin sheet, woven mesh, non-woven mesh, and combinations thereof. One skilled in the art will readily visualize other possible materials and combinations of the same.

In a preferred embodiment, the porous layer may be nickel metal foam, and may be permeated with aqueous potassium hydroxide. In an embodiment of the cell design, at least one electrode uses an ionomer to achieve optimal performance. Examples of ionomers include any dispersible polymeric material that conducts ions, including anionic polymers, cationic polymers, anion-conducting ceramic particles, polymers with N+H3R functional group, polymers with N+H2R2 functional group, polymers with N+HR3 functional group, polymers with N+R4 functional group, polymers with P+ functional group, anionic polysiloxanes, and mixtures thereof. In some embodiments, AEM ionomers, which are dissolved molecules of similar structure to a polymer used to make a corresponding AEM, may be utilized. One skilled in the art will again readily visualize other possible materials and combinations of the same.

In another preferred embodiment, a hydrogen electrode uses an anion-conducting ionomer. In yet another preferred embodiment, the oxygen electrode uses a fluorinated binder and fluorinated ionomer. Examples of fluorinated ionomers include any dispersible polymeric material that conducts ions and includes a fluorinated backbone, including anionic polymers, cationic polymers, NAFION®, polymers with N+H3R functional group, polymers with N+H2R2 functional group, polymers with N+HR3 functional group, polymers with N+R4 functional group, polymers with P+ functional group, fluorinated anionic polysiloxanes, and mixtures thereof. And once again, one skilled in the art will readily visualize other possible materials and combinations of the same.

As would be known to one skilled in the art, examples of fluorinated binder may include: any dispersible polymeric material that can be used to bind particles within an electrode and includes a fluorinated backbone, including PTFE dispersions, PTFE particles, PTFE-coated particles, anionic polymers, cationic polymers, NAFION®, polymers with N+H3R functional group, polymers with N+H2R2 functional group, polymers with N+HR3 functional group, polymers with N+R4 functional group, polymers with P+ functional group, fluorinated polysiloxanes, and mixtures thereof.

In a preferred embodiment, at least one electrode uses a mixture of hydrophilic and hydrophobic fluorinated binder. In a preferred embodiment, both electrodes are not flooded with liquid but the membrane may be in contact with aqueous electrolyte, allowing operation as a fuel cell and/or electrolyzer. In a preferred embodiment, the liquid electrolyte may be stored in an external reservoir and circulated through the electrode separator layer.

In yet another embodiment, the cell operates as a fuel cell with air as the oxidant. The liquid electrolyte in contact with the AEM prevents the AEM from being converted to its carbonate form. In one embodiment of the cell, the hydrogen electrode contains a non-Ni and non-Pt catalyst that is not severely poisoned by small quantities of carbon monoxide. In another embodiment of the cell, the anode operates on a hydrogen-containing fuel that also contains carbon monoxide and carbon dioxide.

EXAMPLES

Example 1—Fuel Cell or Reversible Fuel Cell

Figure 1A:
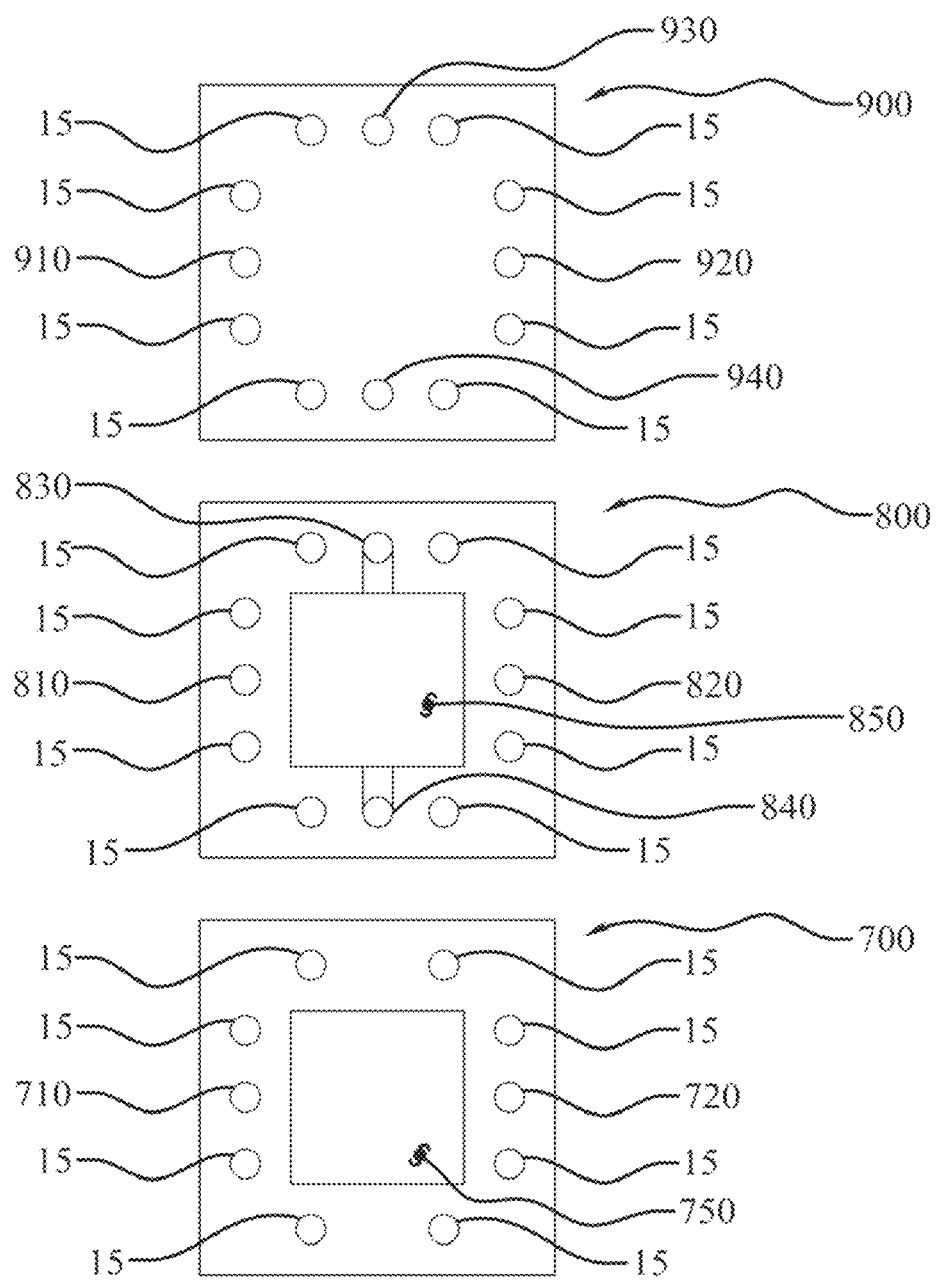
FIG. 1A shows a top plan view of an oxygen endplate, a second oxygen seal, and a first oxygen seal according to an embodiment of the instant invention.
Figure 1B:
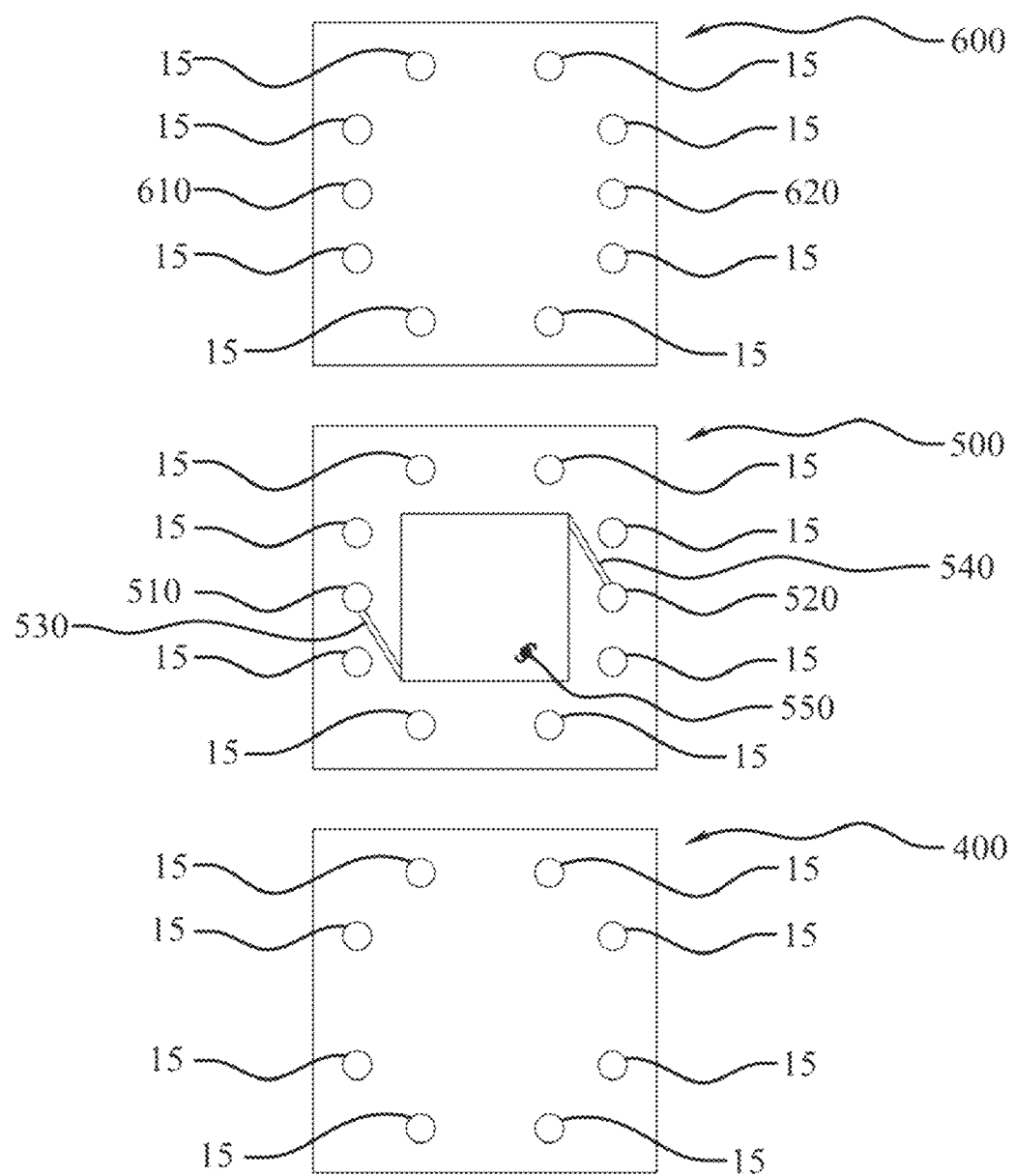
FIG. 1B shows a top plan view of an oxygen side membrane, an electrolyte layer, and a hydrogen side membrane according to an embodiment of the instant invention.
Figure 1C:
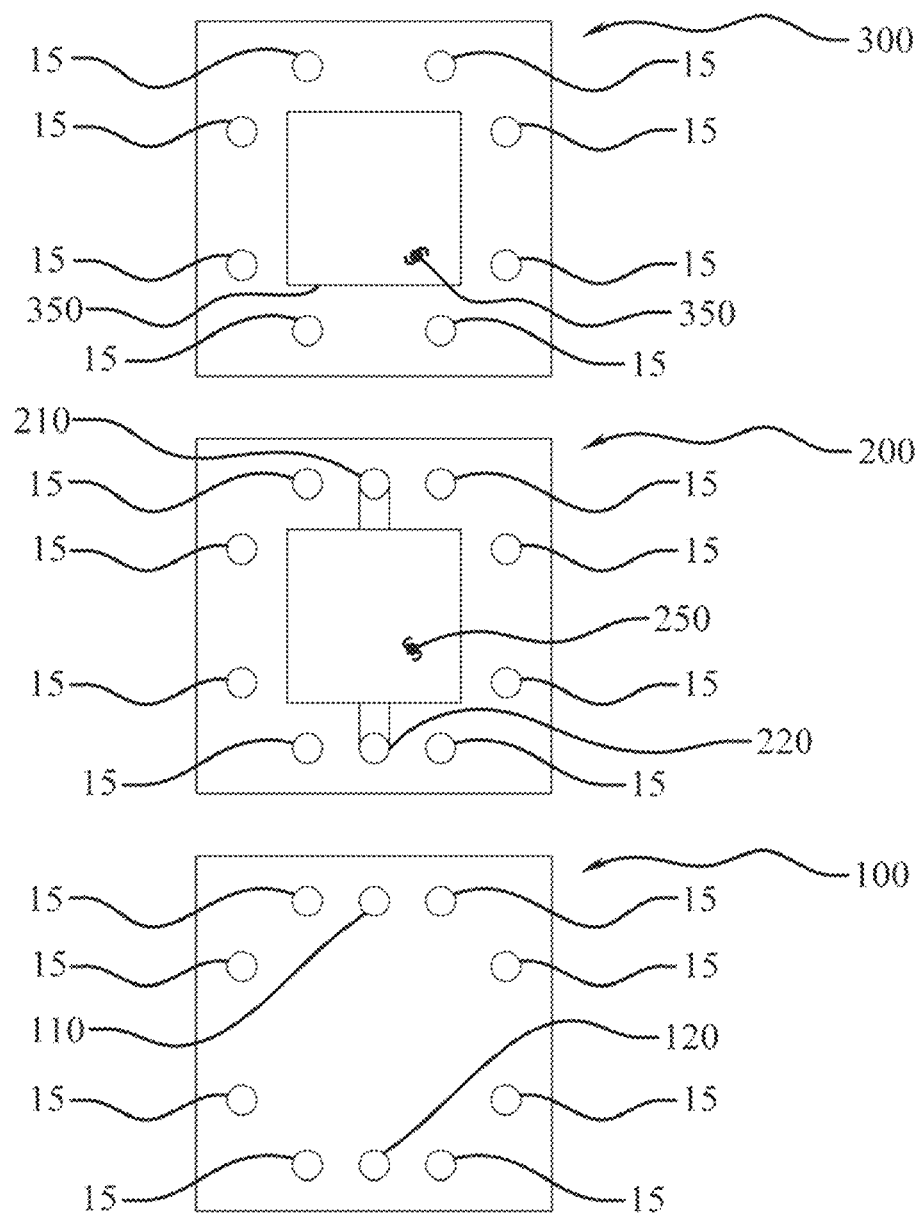
FIG. 1C shows a top plan view of a second hydrogen seal, a first hydrogen seal, and a hydrogen endplate according to an embodiment of the instant invention.
Figure 2A:
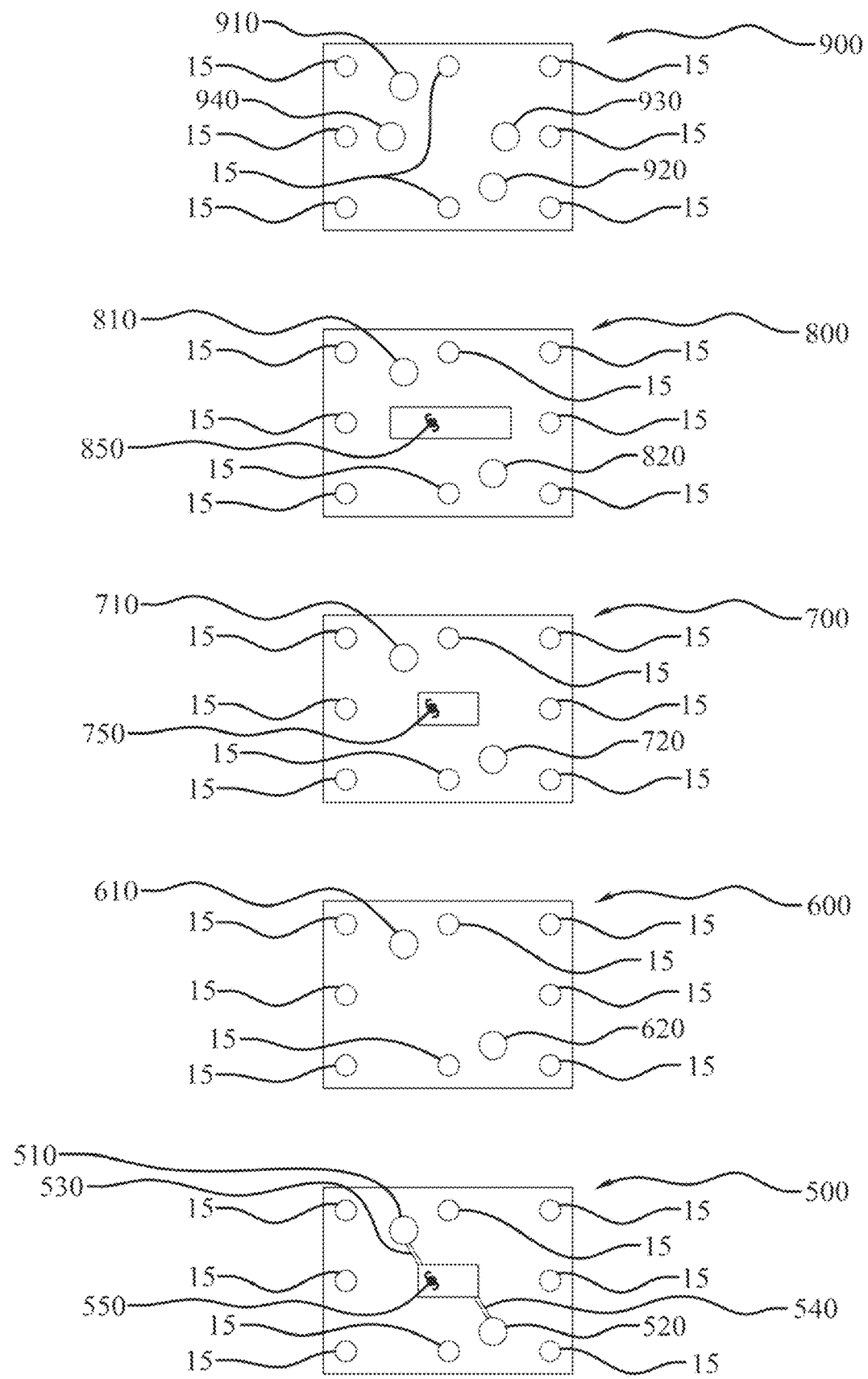
FIG. 2A shows a top plan view of an oxygen endplate, a second oxygen seal, a first oxygen seal, an oxygen side membrane and an electrolyte layer according to another embodiment of the instant invention.
Figure 2B:
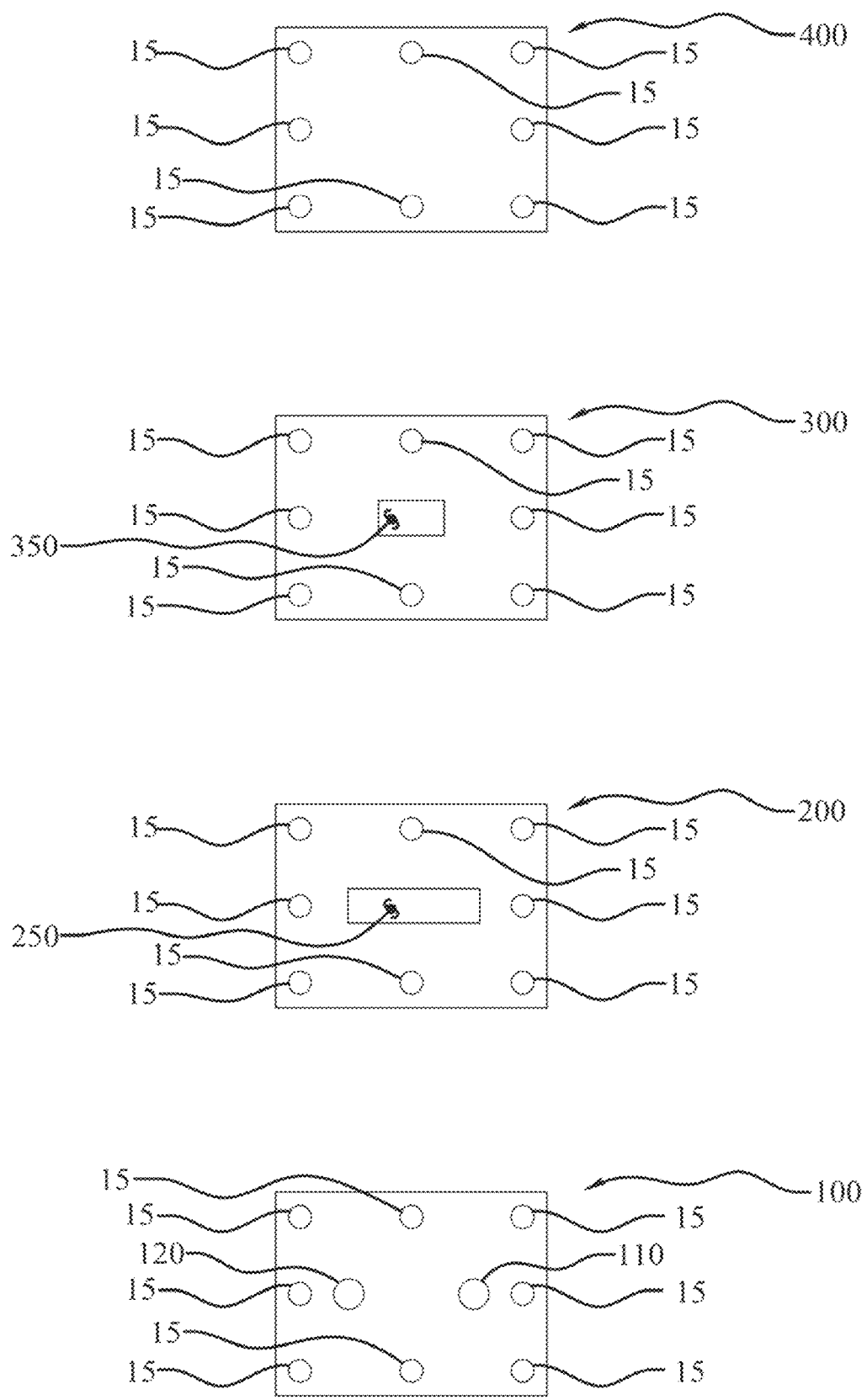
FIG. 2B shows a top plan view of a hydrogen side membrane, a second hydrogen seal, a first hydrogen seal, and a hydrogen endplate according to another embodiment of the instant invention.

FIGS. 1 and 2 show embodiments of the invention. One skilled in the art would know that the layers need not all be of the same thickness, and in fact, there may be a wide variation in layer thicknesses. In an exemplary embodiment, meant by way of example only and not limitation, the end plates may be as much as 10 cm thick, while the membrane layers may be as thin as 1 micron. This cell design may consist of a series of layers that are stacked to form the invention. One skilled in the art would appreciate that some layers may be combined, removed, and/or modified while still maintaining the functionality of the instant invention. The first layer may be the hydrogen electrode end plate (100). In an embodiment the plate may be made of stainless steel. The hydrogen end plate (100) may contain hydrogen inlet (110) and outlet ports (120), and a tab for current collection.

In some instances, such as an electrolysis cell, the hydrogen end plate (100) may only require a hydrogen outlet port (120). The next layer may be the first hydrogen seal (200). In an embodiment the seals are made of thin PTFE sheets. Seal layers could also be made of epoxy, glue(s), sealant(s), other polymers, or a combination thereof. Voids in the seal may extend to the hydrogen port(s) (210, 220) to allow gas in and/or out of the electrode. One skilled in the art would realize that in another embodiment, the ports (210, 220) could be co-extant with current collector mesh and flow field (250). This seal may frame the hydrogen electrode current collector (250), and the hydrogen flow field. In an embodiment, the hydrogen electrode current collector (250) may be stainless steel mesh. In an embodiment the second hydrogen seal may frame a hydrogen electrode (350). In an embodiment, the hydrogen electrode (350) may be porous carbon paper coated with a mixture of catalyst and AEM ionomer. A preferred catalyst for the hydrogen electrode (350) may be 50-wt % ruthenium supported by Vulcan carbon. The hydrogen-side AEM layer (400) may sit on top of the second hydrogen seal (300) and the framed hydrogen electrode (350) layer.

The next layer may be the electrolyte layer (500). The electrolyte layer (500) may consist of a thin separator seal that may frame a porous matrix (550). In one embodiment, the porous matrix may be nickel foam compressed to the thickness of the separator seal. In one embodiment, the separator seal also contains inlet (510) and exit ports (520) for aqueous electrolyte, preferably aqueous KOH. Channels (530, 540) in the electrolyte layer seal allow the electrolyte to flow into the bottom of the porous matrix (550) and out the top of the porous matrix (550). The oxygen-side AEM layer (600) may sit on top of the electrolyte layer (500) and the framed porous matrix layer (550).

Next, the first oxygen seal (700) may sit on top of the oxygen-side AEM (600). This seal may frame the oxygen electrode (750). The oxygen electrode (750) may be porous carbon paper coated with a mixture of catalyst and fluorinated ionomer/binder. A preferred catalyst for the oxygen electrode (750) may be a mixture of nitrogen-doped carbon and Fe/Co metal particles, including oxide and carbide phases. The fluorinated ionomer/binder may be a mixture of NAFION® and dispersed PTFE binder. In an embodiment a second oxygen seal (800) seals the oxygen electrode current collector (850). In this embodiment, the oxygen electrode current collector (850) may be stainless steel mesh. The oxygen-side seal may also contain through-ports (810, 820) for the electrolyte. Voids in the second seal (800) extend to the oxygen inlet (830) and/or outlet port(s) (840) to allow gas in and/or out of the electrode. One skilled in the art would realize that in another embodiment, the ports (830, 840) could be co-extant with current collector mesh and flow field (850).

The final layer may be the oxygen end plate (900). The oxygen end plate (900) may contain oxygen inlet (930) and outlet (940) ports. In some instances, such as an electrolysis cell, the plate may only require an oxygen outlet port (940). The end plate (900) may also contain ports (910, 920) for aqueous electrolyte to enter (910) and exit (920) the cell, and a tab for current collection. One skilled in the art could also appreciate how the design could be modified to enable a number or cell repeat units to be stacked in series. In such a design, the interior layers could use through-ports for the oxygen, hydrogen, and electrolyte. The oxygen and hydrogen ports could be offset in such an embodiment. Conductive interconnect plates could be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports.

One skilled in the art could also envision a number of alternative electrolyte membrane designs. For example, an AEM could be mechanically supported by a porous layer or other mechanical support to stabilize a thin AEM. Further, in some uses for the cell design, it may not be necessary to use two AEM layers per cell. One of the AEM layers could be replaced by a porous separator, such as a porous polypropylene.

One skilled in the art would also appreciate how this cell design could be part of a larger system. That system could include a return line for the exhausted liquid electrolyte to feed it back into an electrolyte reservoir. Liquid return lines from condensation collectors on the gas exits could also be connected in fluid communication with an electrolyte reservoir. One or both of the electrode gases could be in fluid communication with the electrolyte reservoir to maintain similar pressure between layers.

One skilled in the art could also appreciate how this cell design could be useful for other types of electrolysis, such as chlorine or bromine evolution. In such embodiments the electrolyte could be fed to the cell either through the electrolyte layer or one of the electrode chambers. Dry gas could be evolved from one of the electrodes. In other embodiments of the cell, an electrolyzer could utilize an oxygen depolarized cathode, wherein oxygen is fed to an electrode and oxygen reduction occurs in an electrode. In an embodiment of the cell, at least one of the current collectors could not be in contact with the electrolyte, and thus not be as susceptible to electrochemical degradation as flooded electrodes.

Example 2—Flooded Oxygen Electrode Electrolysis

In some embodiments of the instant invention, it may not be necessary to employ two AEM membranes per cell, one example being for flooded oxygen electrode electrolysis. In this embodiment, a series of layers may be stacked to form the cell. FIG. 1 shows the layers used in this embodiment, however, layers 500 and 600 would not be included in this embodiment. The first layer may be the hydrogen electrode end plate (100). In this embodiment the hydrogen end plate (100) may be made of stainless steel. The hydrogen end plate (100) may contain hydrogen inlet (110) and outlet ports (120), and a tab for current collection. In some instances, the hydrogen end plate (100) may only require the hydrogen outlet port (120).

The next layer may be the first hydrogen seal (200). In this embodiment the seals may be made of thin PTFE sheets. Seal layers could also be made of epoxy, glue(s), sealant(s), other polymers, or a combination thereof. Voids in the seal extend to the hydrogen port(s) (110, 120) to allow gas in and/or out of the electrode. This seal may frame the hydrogen electrode current collector (250). In this embodiment, the hydrogen electrode current collector (250) may be stainless steel mesh. The next layer may be the second hydrogen seal (300), which may frame the hydrogen electrode (350). The hydrogen electrode (350) may be porous carbon paper coated with a mixture of catalyst and AEM ionomer. A preferred catalyst for the hydrogen electrode (350) may be 50-wt % ruthenium supported by Vulcan carbon. An AEM layer (400) may sit on top of the second hydrogen seal (300) and the framed hydrogen electrode layer (350). The AEM may be further mechanically supported by a porous matrix filled with aqueous electrolyte. In such an embodiment the porous matrix may be in contact with the flooded electrode, in this embodiment the oxygen electrode (750). The porous matrix may thus be located between the hydrogen side membrane (400) and the oxygen electrode (750).

Next, the first oxygen seal (700) may sit on top of the hydrogen side membrane (AEM) (400). This first oxygen seal (700) may frame the oxygen electrode (750). The second oxygen seal (800) may sit on top of the first seal (700), and the second oxygen seal (800) may frame the oxygen electrode current collector (850). In an embodiment, the oxygen electrode current collector (850) may be nickel mesh and the oxygen electrode (750) may be nickel foam, coated with a mixture of catalyst and binder. In an embodiment, the oxygen electrode (750) may be flooded with an aqueous electrolyte. The electrolyte may be fed to the cell through the oxygen ingress (830) and egress (840) ports. A preferred catalyst for the oxygen electrode (850) may be a mixture of Fe/Co metal particles (including oxide and carbide phases). The binder may be a mixture of NAFION® and dispersed PTFE binder. The oxygen-side seal (800) may also contain inlet (810) and outlet (820) ports for the electrolyte and could also serve as an egress port for any gaseous product.

The final layer may be the oxygen end plate (900). The oxygen end plate (900) may include an inlet port (930) and an oxygen outlet port (940). The oxygen end plate (900) may also contain ports for aqueous electrolyte to enter (930) and exit (940) the cell, and a tab for current collection. One skilled in the art could also appreciate how the design could be modified to enable a number or cell repeat units to be stacked in series. In such a design, the interior layers could use through-ports for the oxygen, hydrogen, and electrolyte. Conductive interconnect plates could be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports.

Example 3—Flooded Hydrogen Electrode Electrolysis

In some embodiments of the invention, it may not be necessary to employ two AEM membranes per cell, one example being for flooded hydrogen electrode electrolysis. In this embodiment, a series of layers may be stacked to form the cell. FIG. 1 shows the layers used in this embodiment, however, layers 500 and 600 would not be included in this embodiment.

The first layer may be the hydrogen electrode end plate (100). In an embodiment the hydrogen end plate (100) may be made of nickel. The hydrogen end plate (100) may contain hydrogen inlet (110) and outlet ports (120), and a tab for current collection. In some instances, the hydrogen end plate (100) may only require the hydrogen outlet port (120). The hydrogen end plate (100) may also contain ports for aqueous electrolyte to enter (110) and exit (120) the cell.

The next layer may be the first hydrogen seal (200). In this embodiment the seals may be made of thin PTFE sheets. Seal layers could also be made of epoxy, glue(s), sealant(s), other polymers, or a combination thereof. Voids in the seal (200) may extend to the hydrogen port(s) (210, 220) to allow gas in (210) and/or out (220) of the cell and electrolyte in (210) and/or out (220) of the cell. This seal (200) may frame the hydrogen electrode current collector (250). In an embodiment, the hydrogen electrode current collector (250) may be nickel mesh. The next layer may be the second hydrogen seal (300). The second hydrogen seal (300) may frame the hydrogen electrode (350). The hydrogen electrode (350) may be porous carbon paper coated with a mixture of catalyst and AEM ionomer. A preferred catalyst for the hydrogen electrode (350) may be 50-wt % ruthenium supported by Vulcan carbon. In an embodiment, the hydrogen electrode (350) may be flooded with an aqueous electrolyte. A hydrogen side membrane (AEM) layer (400) may sit on top of the second hydrogen seal (300) and the framed hydrogen electrode layer (350). In some embodiments, the hydrogen side membrane (AEM) layer (400) may be mechanically supported by a porous matrix that is filled with electrolyte. This porous matrix may be located between the solid hydrogen side membrane (AEM) layer (400) and the flooded hydrogen electrode (350).

Next, the first oxygen seal (700) may sit on top of the hydrogen side membrane (AEM) (400). This seal (700) may frame the oxygen electrode (750). Next, the second oxygen seal (800) may frame the oxygen current collector and flow field (850). In an embodiment, the oxygen electrode current collector (850) may be nickel mesh and the oxygen electrode (750) may be carbon paper coated with a mixture of catalyst and binder. A preferred catalyst for the oxygen electrode (750) may be a mixture of Fe/Co metal particles (including oxide and carbide phases). The binder may be a mixture of NAFION® and dispersed PTFE binder.

The final layer may be the oxygen end plate (900). The oxygen end plate (900) may include an oxygen outlet port (940). The end plate (900) may also include a tab for current collection. One skilled in the art could also appreciate how the design could be modified to enable a number of cell repeat units to be stacked in series. In such a design, the interior layers could use through-ports for the oxygen, hydrogen, and electrolyte. Conductive interconnect plates would be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports.

Example 4—Reversible Fuel Cell Tests

Figure 3:
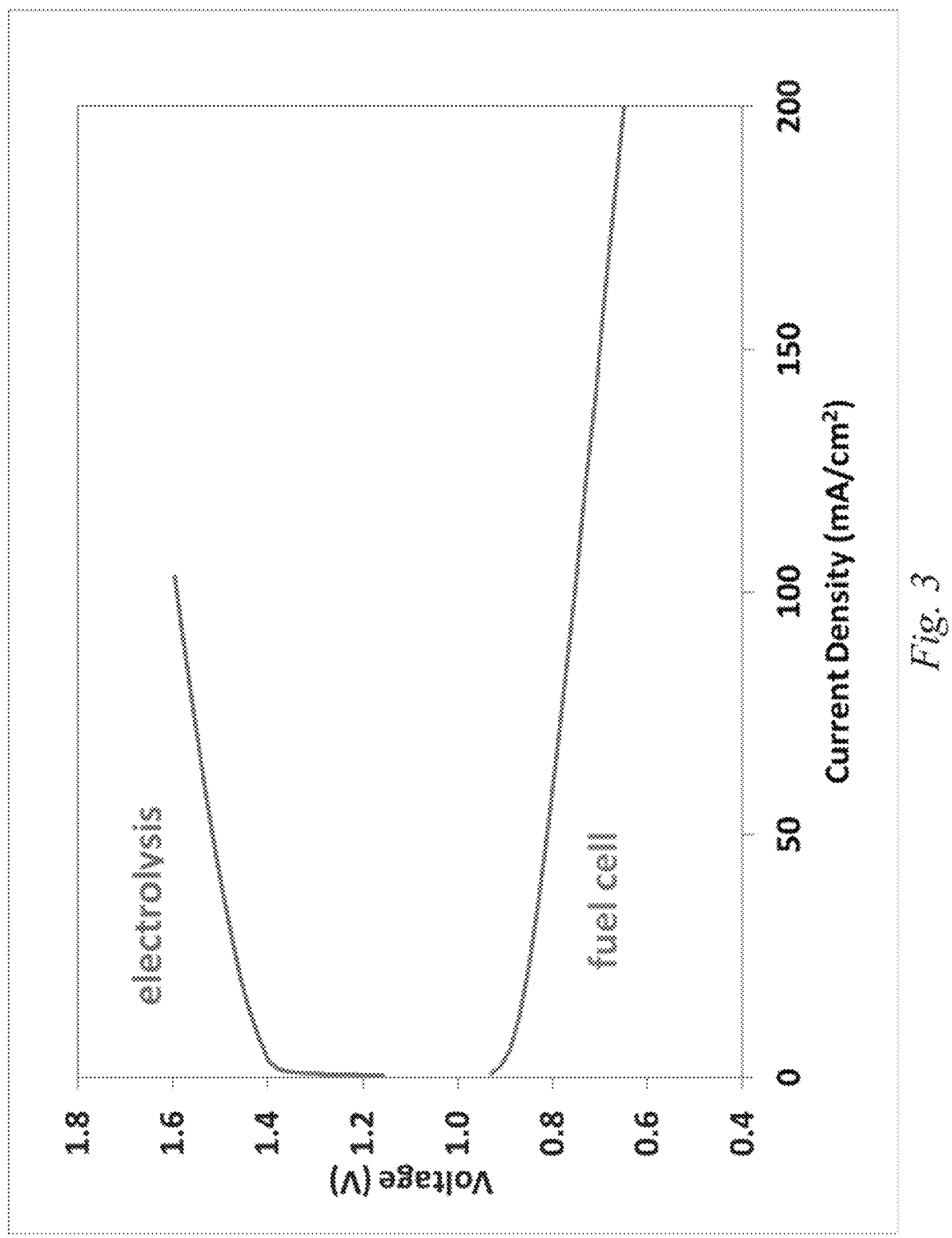
FIG. 3 shows exemplary current-voltage curves obtained for water electrolysis and fuel cell currents.

A cell with the design described in Example 1 was tested for reversible fuel cell and electrolysis operation. The cell had an active electrode area of 25 $cm^2$. Pure hydrogen and oxygen was sent to the respective electrodes at a flow rate of 300 sccm each, both humidified to a 25° C. dew point. Aqueous 5 M KOH electrolyte was circulated through the electrolyte layer at 3 cc/min. After purging trapped air, the gases and electrolyte were pressurized to 3 bar. The cell was initially heated to 60° C. using an external heater. Current-voltage curves were obtained at electrolysis and fuel cell voltages, as shown in FIG. 3. The same cell may be capable of excellent operation as either a fuel cell or an electrolyzer.

Figure 4:
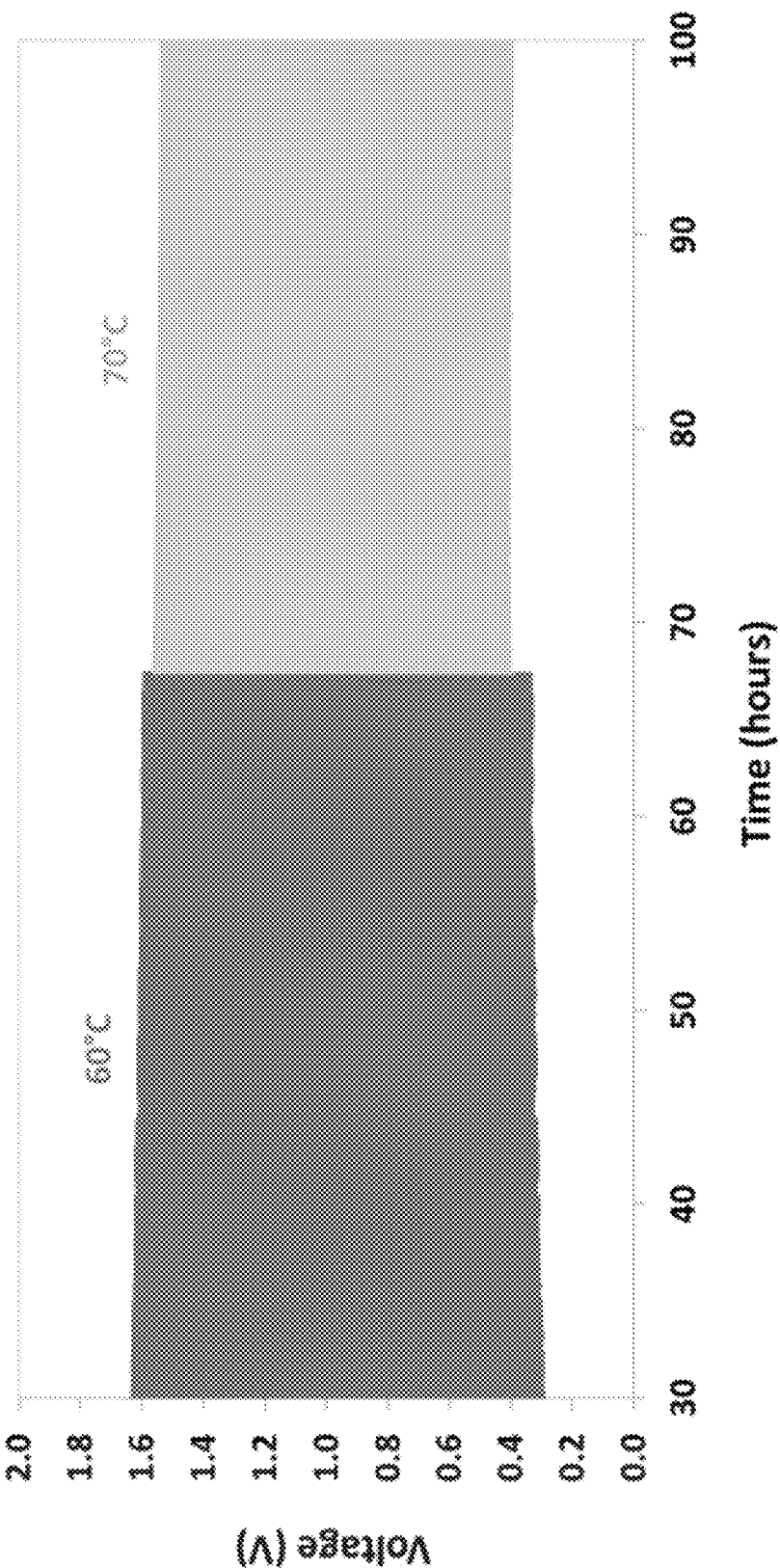
FIG. 4 shows exemplary accelerated degradation cycling for a reversible fuel cell embodiment.

Next, rapid cycles between fuel cell and electrolysis operation were performed, as shown in FIG. 4. These cycles involved 1 minute of fuel cell current load, followed by 1 minute of open circuit, followed by one minute of electrolysis load, followed by another minute of open circuit. The fuel cell load was 150 $mA/cm^2$. The electrolysis load was 50 $mA/cm^2$. After 30 hours of break-in period, 500 cycles were performed at 60° C., followed by 500 cycles at 70° C. Those skilled in the art would appreciate that most cell designs and catalysts, except for perhaps reversible PEM cells with Pt/Ir electrodes, suffer rapid degradation under these cycling conditions. Further, humidity control and stability would be challenging under this long-term operation. Surprisingly, this non-Pt and non-Ir cell design may be quite stable under these operating conditions.

Figure 5:
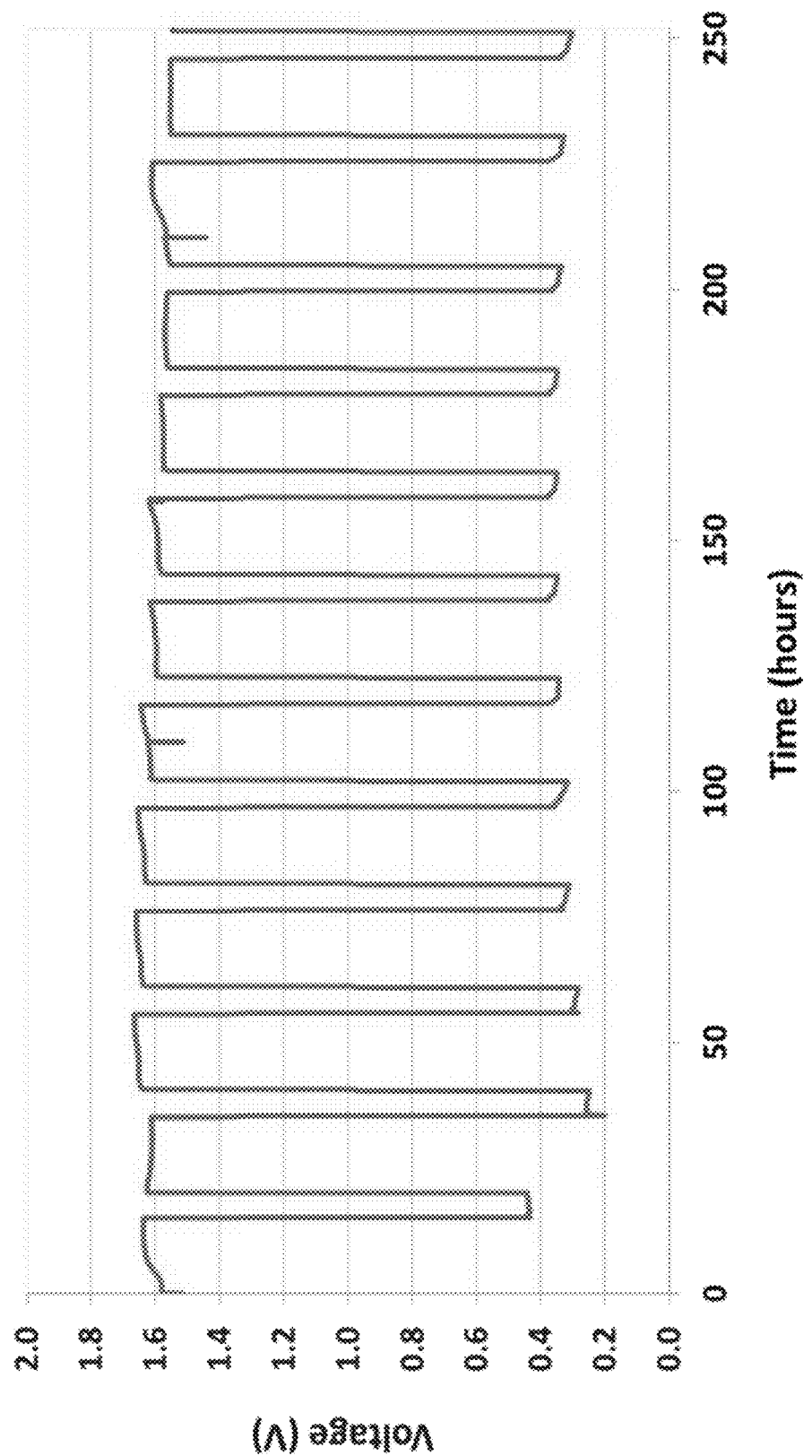
FIG. 5 shows exemplary steady-state cycling for a reversible fuel cell embodiment.

Finally, longer-term cycles between fuel cell and electrolysis operation were performed, as shown in FIG. 5. These cycles involved about 5 hours of fuel cell current load, followed by 10 minutes of open circuit, flowed by about 15 hours of electrolysis load, followed by another 10 minutes of open circuit. The fuel cell load was 150 $mA/cm^2$. The electrolysis load was 50 $mA/cm^2$. Over 250 hours, the cell operated reversibly as a fuel cell and electrolyzer. Those skilled in the art would appreciate that most cell designs and catalysts, except for reversible PEM cells with Pt/Ir electrodes, suffer rapid degradation under these cycling conditions. Further, humidity control and stability would be challenging under this long-term operation. Surprisingly, this non-Pt and non-Ir cell design may be also quite stable under these operating conditions.

Example 5—Steady-State Electrolysis Tests

Figure 6:
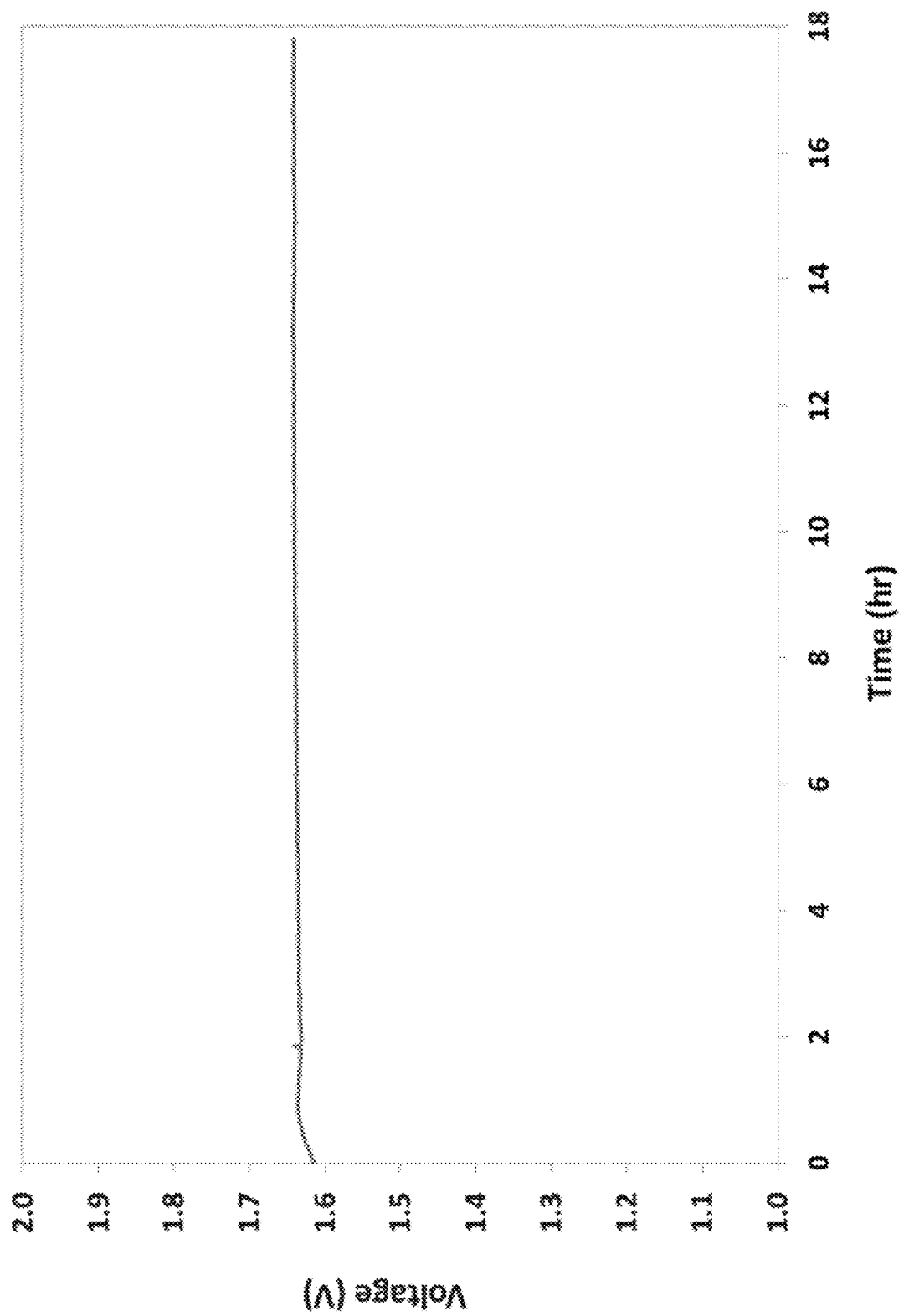
FIG. 6 shows exemplary steady-state voltage for an oxygen-flooded electrode embodiment.

A cell with the design described in Example 2 was tested for steady-state electrolysis operation. The cell had an active electrode area of 25 cm2. Nitrogen at 3 bar was sent to the hydrogen electrode (cathode) at a flow rate of 30 sccm. Aqueous 5 M KOH electrolyte was circulated through the oxygen electrode chamber at 3 cc/min. After purging trapped air, the gases and electrolyte were pressurized to 3 bar. The cell was initially heated to 60° C. using an external heater. The cell was operated under steady-state electrolysis for 18 hours at 50 $mA/cm^2$ (see FIG. 6). The voltage was steady throughout the operation. In further testing (data not shown), the current was increased in 50 $mA/cm^2$ increments every 2 hours up to 250 $mA/cm^2$ while testing the purity of the hydrogen and oxygen with a gas chromatograph. Greater than 99.99% selectivity to hydrogen and oxygen versus other permanent gases was detected.

Example 6—Fluorinated NAFION® Versus Hydrocarbon Binder

Reversible oxygen electrode operation was tested for a cell using the design embodiment described in Example 3. In this cell, a nickel mesh was used for the hydrogen electrode, and the hydrogen electrode was flooded with 5 M KOH. The active electrode area was 2-$cm^2$. The oxygen flow rate was 50 sccm. The cell was tested at 45° C. for reversible fuel cell and electrolysis operation. A reference electrode was placed in the electrolyte and compared to the oxygen electrode. The voltage of the oxygen electrode is graphed in FIGS. 7 and 8 versus a reversible hydrogen electrode reference for two different embodiments, respectively.

FIG. 7 shows oxygen electrode performance using a commercial hydrocarbon AEM ionomer in the electrode. FIG. 8 shows the oxygen electrode performance using a mixture of NAFION® (functionalized fluorocarbon) ionomer/binder and PTFE in the electrode. As expected, using hydrocarbon AEM ionomer in the non-flooded oxygen electrode performs well initially under fuel cell or electrolysis currents. The AEM ionomer extends ion conductivity into the electrode, increasing performance of the electrode and lowering operating voltage at a given current density. In the electrode prepared with NAFION® and PTFE, initial performance was similar to the electrode loaded with AEM ionomer. This result is surprising because NAFION® is not designed to conduct anions. The electrode loaded with hydrocarbon AEM ionomer degrades as current is cycled between fuel cell and electrolysis operation. This could be explained by oxidation of the hydrocarbon ionomer under electrolysis operation, and a resulting loss in ion conductivity.

Conversely, the electrode with NAFION® fluorocarbon ionomer/binder, and all other catalysts, components, and operating conditions being identical, does not degrade rapidly. Some spikes in electrolysis voltage were observed during cycling, but this was likely due to humidity control in the electrode, and only lasts for a few seconds before the voltage returns to typical operating values.

As one skilled in the art would realize, and by way of example only and not limitation, it is possible that a small amount of aqueous electrolyte permeates through the AEM into the oxygen electrode, thus extending ionic conductivity into the electrode. However, the excellent oxygen reduction performance of the electrode indicates that gas is still accessible to the electrode catalyst, and thus the electrode is not fully flooded. Inspection of the electrode after testing confirmed that the membrane side of the oxygen electrode was wetted and the current collector and flow field side of the electrode was dry.

Thus, in multiple embodiments, an electrochemical cell (10) is presented along with a method of using the same. The electrochemical cell (10) may have at least one electrode (350, 750) substantially free of liquid water and in electrochemical contact with an electrolyte layer (400, 500)(500, 600). The electrochemical cell (10) may further have at least one gas impermeable anion-conducting membrane (400, 600) having a first side and a second side, and be in electrochemical contact with the electrode (350, 750) on the first side, and in electrochemical contact with a porous non-electrode layer (550) permeated with aqueous liquid on the second side of the membrane (400, 600). In certain embodiments, the aqueous liquid may be a liquid electrolyte having a pH equal to or greater than 7.0.

In various embodiments, the electrolyte layer (400, 500) (500, 600) may include a second gas-impermeable membrane (400, 600). The porous non-electrode layer (550) may have an opposing first side and a second side, wherein each membrane (400, 600) may be located on one of the opposing sides of the porous non-electrode layer (550) that is permeated by a high pH aqueous liquid.

In some embodiments, the electrochemical cell (10) may have a second electrode (350, 750) where the second electrode (350, 750) is equal to or more than 50% filled with liquid electrolyte. In some embodiments, the second electrode (350, 750) may be an anode, while in other embodiments, the second electrode (350, 750) may be a cathode. As would be appreciated by one skilled in the art, in some embodiments, the electrochemical cell (10) may be a fuel cell, and/or a fuel cell and water electrolyzer. In some further embodiments, the electrochemical cell (10) may be an electrolyzer with an oxygen depolarized cathode.

In a series of embodiments, the electrolyte layer (400, 500)(500,600) may include a porous non-electrode layer (550) that is electrically conductive. In some further embodiments, evolved gas may be electrochemically pressurized within the electrochemical cell (10). In yet other embodiments, the electrochemical cell (10) may use hydrophilic fluorinated binder in a gas-evolving evolving electrode (750), while in others, may use hydrophilic fluorinated binder in an oxygen-evolving electrode (750). The electrochemical cell (10) may use hydrophilic fluorinated binder in an oxygen-evolving electrode (750).

In some embodiments, the electrochemical cell (10) may use a mixture of hydrophilic fluorinated binder and hydrophobic fluorinated binder in a gas-evolving electrode (750), and in some embodiments, the electrochemical cell (10) may use a mixture of hydrophilic fluorinated binder and hydrophobic fluorinated binder in an oxygen-evolving electrode (750). In still others, the electrochemical cell (10) may use a mixture of hydrophilic fluorinated binder and hydrophobic fluorinated binder in a gas-evolving electrode (750).

In a further series of embodiments, an electrochemical cell (10) may have multiple layers, including a hydrogen end plate (100) further having a hydrogen ingress port (110) and a hydrogen egress port (120). Such a layer may be in electrochemical contact with a first hydrogen seal layer (300) further having a hydrogen electrode (350), in electrochemical contact with a hydrogen side membrane (400). Such a layer may then be in electrochemical contact with an electrolyte layer (500) further having an electrolyte ingress port (510), an electrolyte egress port (520), an electrolyte inlet channel (530), and electrolyte outlet channel (540), and a porous non-electrode layer (550). This layer may be in electrochemical contact with an oxygen side membrane (600), and then be in electrochemical contact with a first oxygen seal layer (700) having an oxygen electrode (750). The above may then be in electrochemical contact with an oxygen end plate (900) further comprising an oxygen ingress port (930) and an oxygen egress port (940).

In some embodiments, meant by way of example only and not limitation, the electrochemical cell (10) may further include a second hydrogen seal layer (200) having a hydrogen ingress port (210), a hydrogen egress port (220), and an hydrogen current collector and flow field (250) in electrochemical contact with both the hydrogen seal layer (300) and the hydrogen end plate (100). In others, a second oxygen seal layer (800) may further include an electrolyte ingress port (810), an electrolyte egress port (820), an oxygen ingress port (830), an oxygen egress port (840) and a current collector mesh and flow field (850), in electrochemical contact with both the oxygen seal layer (700) and the hydrogen end plate (900).

As would be seen by one skilled in the art, the hydrogen seal layers (200, 300) may be formed as a unitary structure, while equally well, the oxygen seal layers (700, 800). may be formed as a unitary structure.

A method of using an electrochemical cell (10) to generate gas from an electrolyte could include the step of feeding electrolyte to a non-electrode porous layer in electrochemical contact with a first side of an anion-conducting membrane having a first side and a second side, wherein the second side of the anion-conducting membrane is in electrochemical contact with a substantially non-flooded gas-evolving electrode layer. Such a method could include that the substantially non-flooded gas-evolving electrode layer may be less than 50% flooded with electrolyte.

Having a substantially non-flooded gas-evolving electrode layer facilitate gas flow within the cell (10) and minimizes corrosion caused by having electrolyte in fluid contact with the current collector.

Example 7—Reversible Fuel Cell with Differential Pressure

FIGS. 1 and 2 show embodiments of the invention. One skilled in the art would know that the layers need not all be of the same thickness, and in fact, there may be a wide variation in layer thicknesses. In an exemplary embodiment, meant by way of example only and not limitation, the end plates may be as much as 15 cm thick, while the membrane layers may be as thin as 1 micron. This cell design consists of a series of layers that are stacked to form the invention. One skilled in the art would appreciate that some layers may be combined, removed, and/or modified while still maintaining the functionality of the instant invention. Further, in this design the elements are square. One skilled in the art would also appreciate that alternative shapes, such as round cells, may be advantageous for many applications. Further, the seal frame layers need not be the same size. Different opening sizes in seal frame layers may prevent membrane punctures along the edge of the electrodes. The first layer may be the hydrogen electrode endplate (100). In this embodiment the plate may be made of stainless steel, nickel alloy, or other material appropriate for transferring compressive forces and conducting electricity. The hydrogen end plate (100) may contain hydrogen inlet (110) and outlet ports (120), and a tab for current collection.

In some instances, such as an electrolysis cell or a dead-ended reversible fuel cell, the hydrogen end plate (100) may only require a hydrogen outlet port (120). The next layer may be the first hydrogen seal (200). In this embodiment, the seals are made of thin PTFE sheets. Seal layers could also be made of epoxy, glue, sealants, other polymers, coated metal gaskets, ceramic gasket materials, or a combination thereof. Voids in the seal extend to the hydrogen port(s) (210, 220) to allow gas in and/or out of the electrode. One skilled in the art would realize that in another embodiment, the ports (210, 220) could be co-extant with current collector mesh and flow field (250). This seal may frame the hydrogen electrode current collector (250), and the hydrogen flow field.

In an embodiment, the hydrogen electrode current collector (250) may be stainless steel mesh, nickel mesh, or any other material that can conduct electricity and allows for passage of gas. In another embodiment the second hydrogen seal (300) may frame a hydrogen electrode (350). In an embodiment, the hydrogen electrode (350) may be porous carbon paper coated with a mixture of catalyst and ionomer, thus forming a Gas Diffusion Electrode (GDE). In a further embodiment the catalyst may be coated on the AEM. A catalyst for the hydrogen electrode (350) may be any catalyst that is active for hydrogen evolution or hydrogen oxidation. A catalyst for the hydrogen electrode (350) may be 50-wt % ruthenium supported by carbon.

The hydrogen-side AEM layer (400) may sit on top of the second hydrogen seal (300) and the framed hydrogen electrode (350) layer. In one embodiment, the AEM layer consists of a thin anion-conducting gas impermeable AEM supported by a porous support. The non-porous section of such an AEM layer would preferably be in contact with the hydrogen electrode. As will be apparent with the description below, the porous part of the AEM layer would become infiltrated with aqueous electrolyte during cell operation. The AEM may be cast on a porous support prior to cell assembly to aid in handling and processing a thin AEM. The porous support could be any porous material, including polymer, carbon, metal, or ceramic. It may be porous only in the z-direction (perpendicular to the membrane face) to allow infiltration with electrolyte and enhanced ionic conductivity, or porous in the x, y, and z direction. In one embodiment, the porous support is a low-cost porous polypropylene layer. In the case of cells with pressure differential, the porous support for the AEM layer could provide the necessary structural support for the AEM to handle pressure differentials.

The next layer may be the electrolyte layer (500). The electrolyte layer (500) consists of a thin separator seal that may frame a porous matrix (550). In one embodiment, the porous matrix may be nickel foam compressed to the thickness of the separator seal. In one embodiment the porous matrix may be a porous polypropylene layer. In another embodiment, the porous matrix may be infiltrated with catalyst. The catalyst could accelerate decomposition of free radicals or react hydrogen and oxygen to form water. Examples of catalyst could include Pt, Co, Ni, Fe, other high surface area transition metals, cerium oxide, other metal oxides, active carbon, functionalized polymers, and mixtures thereof. In another embodiment, the hydrogen-side AEM layer (400) and the porous matrix (550) are combined into a single component. In a further embodiment, the hydrogen-side AEM layer (400), the electrolyte layer (500), including both the porous matrix and the frame, are combined into a single component. In this case, the porous matrix would be made to be non-porous in the x-y direction to form the frame and prevent electrolyte from leaking out of the cell.

In one embodiment, the separator seal also contains inlet and exit ports (510, 520) for liquid electrolyte, preferably aqueous KOH or any other liquid electrolyte for transport of ions. Channels in the electrolyte layer seal allow the electrolyte to flow into the bottom of the porous matrix (550) and out the top of the porous matrix (550).

The oxygen-side AEM layer (600) may sit on top of the electrolyte layer and the framed porous matrix layer. The oxygen-side AEM layer (600) may be an AEM. In some embodiments, this layer could be a porous separator, such as porous polypropylene. In some embodiments this layer may be combined with the porous matrix (550), or not present at all if the porous matrix is not electrically conductive.

Next, the first oxygen seal (700) may sit on top of the oxygen-side AEM (600). This seal may frame the oxygen electrode (750). The oxygen electrode (750) may be porous carbon paper coated with a mixture of catalyst and fluorinated ionomer. The oxygen electrode (750) may be porous non-woven stainless steel fabric coated with a mixture of catalyst and fluorinated ionomer. The oxygen electrode (750) may be porous nickel foil, foam, or felt, coated with a mixture of catalyst and fluorinated ionomer. A preferred catalyst for the oxygen electrode (750) may be a mixture of nitrogen-doped carbon and Fe/Co metal particles, including oxide and carbide phases. Another preferred catalyst for the oxygen electrode (750) may be a mixture of Pt, Ni, Co, and/or Fe metal particles, including oxide and carbide phases. The fluorinated ionomer may be a mixture of NAFION® and dispersed PTFE binder. In an embodiment a second oxygen seal (800) seals the oxygen electrode current collector (850). In this embodiment, the oxygen electrode current collector (850) may be stainless steel mesh or nickel mesh. The oxygen-side seal may also contain through-ports (810, 820) for the electrolyte. Voids in the second seal (800) extend to the oxygen inlet/outlet port(s) (830, 840) to allow gas in and/or out of the electrode. One skilled in the art would realize that in another embodiment, the ports (830, 840) could be co-extant with current collector mesh and flow field (850). In the case of cells with pressure differential, any of the oxygen-side layer (600), seals (700, 800), electrode (750), or current collector (850) could provide structural support for the cell or membrane to handle pressure differential.

The final layer may be the oxygen end plate (900). The oxygen end plate (900) may contain oxygen inlet (930) and outlet (940) ports. In some instances, such as an electrolysis cell or dead-ended reversible fuel cell, the plate may only require an oxygen outlet port (940). The endplate (900) may also contain ports (910, 920) for aqueous electrolyte to enter and exit the cell, and a tab for current collection. One skilled in the art could also appreciate how the design could be modified to enable a number or cell repeat units to be stacked in series. In such a design, the interior layers could use through-ports for the oxygen, hydrogen, and electrolyte. The oxygen and hydrogen ports could be offset in such an embodiment. Conductive interconnect plates could be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports.

One skilled in the art could also envision a number of alternative electrolyte membrane designs. For example, an AEM could be mechanically supported by a porous layer or other mechanical support to stabilize a thin AEM. Further, in some uses for the cell design it may not be necessary to use two AEM layers per cell. One of the AEM layers could be replaced by a porous separator, such as a porous polypropylene.

One skilled in the art could appreciate that a number of the layers could be combined to reduce the total part count. For instance, a number of the seal layers could be combined into a single seal that performs the same function.

One skilled in the art would also appreciate how this cell design could be part of a larger system. That system could include a return line for the exhausted liquid electrolyte to feed it back into an electrolyte reservoir. Liquid return lines from condensation collectors on the gas exits could also be connected in fluid communication with an electrolyte reservoir. One or both of the electrode gases could be in fluid communication with the electrolyte reservoir to maintain similar pressure between layers.

One skilled in the art could also appreciate how this cell design could be useful for other types of electrolysis, such as chlorine or bromine evolution. In such embodiments the electrolyte could be fed to the cell either through the electrolyte layer or one of the electrode chambers. Dry gas would be evolved from one of the electrodes. At least one of the current collectors could not be in contact with the electrolyte, and thus not be as susceptible to electrochemical degradation.

Example 8—Flooded Oxygen Electrode Electrolysis

In some embodiments of the instant invention, it may not be necessary to employ two AEM membranes per cell, one example being for flooded oxygen electrode electrolysis. In this embodiment, a series of layers are stacked to form the cell. FIG. 1 shows the layers used in this embodiment, however, layers 500 and 600 are not included in this embodiment. The first layer may be the hydrogen electrode endplate (100). In this embodiment the hydrogen end plate (100) may be made of stainless steel. The hydrogen end plate (100) may contain hydrogen inlet (110) and outlet ports (120), and a tab for current collection. In some instances, the hydrogen end plate (100) may only require the hydrogen outlet port (120).

The next layer may be the first hydrogen seal (200). In this embodiment the seals are made of thin PTFE sheets. Seal layers could also be made of epoxy, glue, sealant, other polymers, or a combination thereof. Voids in the seal extend to the hydrogen port(s) (110, 120) to allow gas in and/or out of the electrode. This seal may frame the hydrogen electrode current collector (250). In this embodiment, the hydrogen electrode current collector (250) may be stainless steel mesh, nickel mesh, or any material that is able to conduct electricity and permits the passage of gas. The next layer is the second hydrogen seal (300), which may frame the hydrogen electrode (350). The hydrogen electrode (350) may be porous carbon paper coated with a mixture of catalyst and AEM ionomer, thus forming a GDE. A preferred catalyst for the hydrogen electrode (350) may be 50-wt % ruthenium supported by Vulcan carbon. An AEM layer (400) may sit on top of the second hydrogen seal (300) and the framed hydrogen electrode layer (350).

The AEM may be further mechanically supported by a porous matrix filled with aqueous electrolyte. In such an embodiment the porous matrix may be in contact with the flooded electrode, in this embodiment, the oxygen electrode (750). The porous matrix may thus be located between the hydrogen side membrane (400) and the oxygen electrode (750).

In an embodiment, the AEM layer consists of a thin anion-conducting gas impermeable AEM cast onto a porous support. The non-porous section of such an AEM layer would preferably be in contact with the hydrogen electrode. The porous support for the AEM layer would become infiltrated with aqueous electrolyte during cell operation. The AEM may be cast on a porous support prior to cell assembly to aid in handling and processing a thin AEM. The porous support could be any porous material, including polymer, carbon, metal, or ceramic. It may be porous only in the z-direction (perpendicular to the membrane face) to allow infiltration with electrolyte and enhanced ionic conductivity, or porous in the x, y, and z direction. In one embodiment, the porous support is a low-cost porous polypropylene layer. In the case of cells with pressure differential, the porous support for the AEM layer could provide the necessary structural support for the AEM to handle pressure differentials. In another embodiment, the porous matrix may be a porous polypropylene layer infiltrated with catalyst. The catalyst could accelerate decomposition of free radicals or react hydrogen and oxygen to form water.

Next, the first oxygen seal (700) may sit on top of the hydrogen side membrane (AEM) (400). This first oxygen seal (700) may frame the oxygen electrode (750). The second oxygen seal (800) may sit on top of the first seal (700), and the second oxygen seal (800) may frame the oxygen electrode current collector. (850). In an embodiment, the oxygen electrode current collector (850) may be nickel mesh and the oxygen electrode (750) may be nickel foam, foil, or felt, coated with a mixture of catalyst and binder. In an embodiment, the oxygen electrode (750) may be flooded with an aqueous electrolyte. The electrolyte may be fed to the cell through the oxygen ingress (830) and egress (840) ports. A preferred catalyst for the oxygen electrode (850) may be a mixture of Fe/Co metal particles (including oxide and carbide phases). The binder may be a mixture of NAFION® and dispersed PTFE binder. The oxygen-side seal (800) may also contain inlet and outlet ports for the electrolyte and could also serve as an egress port for any gaseous product.

The final layer may be the oxygen end plate (900). The oxygen end plate (900) may include an inlet port (930) and an oxygen outlet port (940). The oxygen end plate (900) may also contain ports for aqueous electrolyte to enter (930) and exit (940) the cell, and a tab for current collection. One skilled in the art could also appreciate how the design could be modified to enable a number or cell repeat units to be stacked in series. In such a design, the interior layers could use through-ports for the oxygen, hydrogen, and electrolyte. Conductive interconnect plates could be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports. To enable easier maintenance of degraded components or recovery of valuable catalyst, components, such as GDEs, seals, and membranes could be designed to be easily removed and replaced or recycled.

What is claimed then, in a further series of embodiments, is an electrochemical cell (10) having an electrode (350, 750) that is substantially free of liquid water and in direct contact with an electrolyte layer (400, 500)(500, 600). The electrode (350, 750) may further include a gas impermeable anion-conducting membrane (400, 600). The membrane (400, 600) may have an opposing first side and second side, such that the membrane (400, 600) may be in direct contact with the electrode (350, 750) on the first side, and a porous non-electrode layer (550) permeated with high pH aqueous liquid on the second side. The cell (10) may be configured such that a significant pressure differential exists between the opposing sides of the membrane.

The high pH aqueous liquid may have a pH equal to or greater than 7.0, and the porous non-electrode layer (550) may further include a catalytically active component for free radical decomposition or hydrogen oxidation.

The cell (10) may be part of a reversible fuel cell system, a water electrolyzer, and/or a unitized reversible fuel cell, as well as be suited for other applications as would be known to one skilled in the art.

In certain embodiments, the porous non-electrode layer (550) provides mechanical support for a thin membrane under a pressure differential, and this porous non-electrode layer (550) may provide mechanical support for the thin membrane under a pressure differential of greater than 30 bar. In other embodiments, the porous non-electrode layer (550) provides mechanical support for the thin membrane under pressure differentials ranging from at least 30 bar to greater than 700 bar, as would be realized by one skilled in the art.

In yet another series of embodiments, there may be an electrochemical cell (10) having an electrode (350, 750) substantially free of liquid water and in direct contact with an electrolyte layer (400, 500)(500, 600). The cell (10) may further have a gas impermeable ion-conducting membrane (400, 600) with an opposing first side and second side such that there is direct contact with an electrode (350, 750) on the first side, and with a porous non-electrode structure (550) permeated with aqueous electrolyte on the second side. The cell (10) may be configured such that a significant pressure differential exists between the opposing sides of the membrane.

In some variations of these embodiment, the aqueous electrolyte may have a pH equal to or greater than 7.0. In yet others, the porous non-electrode structure (550) may include a catalytically active component for free radical decomposition or hydrogen oxidation.

The cell (10) may function as a reversible fuel cell system, a water electrolyzer, and/or a unitized reversible fuel cell, as well as serving other functionalities that would be appreciated by one skilled in the art.

In yet a further series of embodiments, the porous non-electrode structure (550) may provide mechanical support for a thin membrane under a pressure differential. Said differential may be greater than 30 bar, greater than 200 bar, greater than 700 bar, or even more, as again would be appreciated by one skilled in the art.

The gas impermeable ion-conducting membrane (400, 600) and the porous non-electrode layer (550) may provide mechanical support for a thin membrane and may be combined in a single component comprising a solid gas impermeable anion conduction layer and a porous non-electrode layer (550) and the gas impermeable ion-conducting membrane (400, 600) may be an anion exchange membrane. Within the cell (10) the electrode may be a hydrogen evolving electrode that is substantially free of liquid water.

In yet another embodiment, an electrochemical cell (10) is presented; a water electrolyzer further having a hydrogen evolving electrode (350, 750) that is substantially free of liquid water and in direct contact with an electrolyte layer (400, 500)(500, 600). The cell may include a gas impermeable anion exchange membrane (400), having an opposing first side and a second side, with direct contact with the electrode (350, 750) on the first side, and a porous non-electrode layer (550) permeated with an aqueous liquid having a pH equal to or greater than 7.0 on the second side. The porous non-electrode layer (550) may provide mechanical support for the gas impermeable anion exchange membrane (400) under a pressure differential of greater than 30 bar between the first side and the second side. Further, the electrolyte layer (600) may be a porous separator permeated with liquid electrolyte.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations.

Accordingly, even though only few variations of the products and methods are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

We claim:

1. An electrochemical cell (10) comprising:
    an electrode (350, 750) substantially free of liquid water and in direct contact with an electrolyte layer (400, 500) (500, 600),
    further comprising a gas impermeable anion-conducting membrane (400, 600),
    having an opposing first side and a second side,
    in direct contact with the electrode (350, 750) on the first side,
    and a porous non-electrode layer (550) permeated with aqueous liquid having a pH greater than or equal to 7.0 on the second side,
    wherein a pressure differential of 30 bar or greater exists between opposing sides of the membrane.

2. The electrochemical cell according to claim 1, wherein the porous non-electrode layer (550) comprises a catalytically active component for free radical decomposition or hydrogen oxidation.

3. The electrochemical cell according to claim 1, wherein the device is part of a reversible fuel cell system.

4. The electrochemical cell according to claim 1, wherein the device is a water electrolyzer.

5. The electrochemical cell according to claim 1, wherein the device is a unitized reversible fuel cell.

6. The electrochemical cell according to claim 1, wherein the porous non-electrode layer (550) provides mechanical support for a thin membrane having a thickness between and including 1 micron and 130 microns under a pressure differential.

7. The electrochemical cell according to claim 6, wherein the porous non-electrode layer (550) provides mechanical support for the thin membrane under a pressure differential of greater than 30 bar.

8. The electrochemical cell according to claim 6, wherein the porous non-electrode layer (550) provides mechanical support for the thin membrane under a pressure differential of greater than 200 bar.

9. The electrochemical cell according to claim 6, wherein the porous non-electrode layer (550) provides mechanical support for the thin membrane under a pressure differential of greater than 700 bar.

10. The electrochemical cell according to claim 1, wherein the gas impermeable anion-conducting membrane (400) and the porous non-electrode layer (550) provide mechanical support for a thin membrane having a thickness between and including 1 micron and 130 microns and are combined in a single component comprising a solid gas impermeable anion conducting layer (400) and a porous non-electrode layer (550) layer.

11. An electrochemical cell (10) comprising:
an electrode (350, 750) substantially free of liquid water and in direct contact with an electrolyte layer (400, 500)(500, 600),
further comprising a gas impermeable ion-conducting membrane (400, 600),
having an opposing first side and a second side,
in direct contact with an electrode (350, 750) on the first side, and a porous non-electrode structure (550) permeated with aqueous electrolyte on the second side,
wherein a pressure differential of 30 bar or greater exists between opposing sides of the membrane.

12. The electrochemical cell according to claim 11, wherein the aqueous electrolyte has a pH equal to or greater than 7.0.

13. The electrochemical cell according to claim 11, wherein the porous non-electrode structure (550) comprises a catalytically active component for free radical decomposition or hydrogen oxidation.

14. The electrochemical cell according to claim 11, wherein the device is part of a reversible fuel cell system.

15. The electrochemical cell according to claim 11, wherein the device is a water electrolyzer.

16. The electrochemical cell according to claim 11, wherein the device is a unitized reversible fuel cell.

17. The electrochemical cell according to claim 11, wherein the porous non-electrode structure (550) provides mechanical support for a thin membrane having a thickness between and including 1 micron and 130 microns under a pressure differential.

18. The electrochemical cell according to claim 16, wherein the porous non-electrode structure (550) provides mechanical support for the thin membrane under a pressure differential of equal to or greater than 30 bar.

19. The electrochemical cell according to claim 16, wherein the porous non-electrode structure (550) provides mechanical support for the thin membrane under a pressure differential of equal to or greater than 200 bar.

20. The electrochemical cell according to claim 16, wherein the porous non-electrode structure (550) provides mechanical support for the thin membrane under a pressure differential of equal to or greater than 700 bar.

21. The electrochemical cell according to claim 11, wherein the gas impermeable anion-conducting membrane (400) and the porous non-electrode layer (550) provide mechanical support for a thin membrane having a thickness between and including 1 micron and 130 microns and are combined in a single component comprising a solid gas impermeable anion conducting layer (400) and a porous non-electrode layer (550).

22. The electrochemical cell according to claim 11, wherein the gas impermeable ion-conducting membrane (400, 600) is an anion exchange membrane.

23. The electrochemical cell according to claim 11, wherein the electrode is a hydrogen evolving electrode that is substantially free of liquid water.

24. An electrochemical cell (10) comprising:
a water electrolyzer further comprising,
a hydrogen evolving electrode (350, 750) substantially free of liquid water and in direct contact with an electrolyte layer (400, 500)(500, 600),
further comprising a gas impermeable anion exchange membrane (400),
having an opposing first side and a second side,
in direct contact with the electrode (350, 750) on the first side, and a porous non-electrode layer (550) permeated with an aqueous liquid having a pH equal to or greater than 7.0 on the second side, wherein the porous non-electrode layer (550) provides mechanical support for the gas impermeable anion exchange membrane (400) under a pressure differential of equal to or greater than 30 bar between the first side and the second side, and wherein the electrolyte layer (600) is a porous separator permeated with liquid electrolyte.

* * * * *